United States Patent
Lin et al.

(10) Patent No.: US 11,580,476 B1
(45) Date of Patent: Feb. 14, 2023

(54) DETECTING A LANDING PAGE THAT VIOLATES AN ONLINE SYSTEM POLICY BASED ON A STRUCTURAL SIMILARITY BETWEEN THE LANDING PAGE AND A WEB PAGE VIOLATING THE POLICY

(71) Applicant: Meta Platforms, Inc., Menlo Park, CA (US)

(72) Inventors: Jiun-Ren Lin, Cupertino, CA (US); Daniel Olmedilla de la Calle, San Carlos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 246 days.

(21) Appl. No.: 17/163,209

(22) Filed: Jan. 29, 2021

Related U.S. Application Data

(62) Division of application No. 15/686,060, filed on Aug. 24, 2017, now Pat. No. 10,936,981.

(51) Int. Cl.
| | |
|---|---|
| *H04L 9/32* | (2006.01) |
| *G06Q 10/0635* | (2023.01) |
| *G06Q 30/0251* | (2023.01) |
| *G06Q 30/0282* | (2023.01) |
| *G06F 16/958* | (2019.01) |
| *G06F 21/12* | (2013.01) |
| *H04L 9/40* | (2022.01) |

(52) U.S. Cl.
CPC ....... *G06Q 10/0635* (2013.01); *G06F 16/958* (2019.01); *G06F 21/128* (2013.01); *G06Q 30/0269* (2013.01); *G06Q 30/0282* (2013.01); *H04L 63/0876* (2013.01)

(58) Field of Classification Search
CPC ............. H04L 63/0876; H04L 63/1483; H04L 63/1416; H04L 63/1425; H04L 63/1433; H04L 63/20; G06F 21/128; G06F 2221/2119; G06F 16/958; G06F 16/0269; G06Q 10/0635
USPC ...................................... 713/176; 726/7, 280
See application file for complete search history.

(56) References Cited

U.S. PATENT DOCUMENTS

| | | | | |
|---|---|---|---|---|
| 7,599,920 | B1 * | 10/2009 | Fox ..................... | G06F 16/9566 709/224 |
| 8,090,800 | B2 * | 1/2012 | Yee ..................... | G06F 16/9574 715/201 |

(Continued)

*Primary Examiner* — Samson B Lemma
(74) *Attorney, Agent, or Firm* — Fenwick & West LLP

(57) ABSTRACT

An online system receives a content item including a link to a landing page and determines a likelihood the landing page violates an online system policy based on a structural similarity between the landing page and a web page violating the policy. To determine the likelihood, the online system determines a hierarchical structure associated with the web page violating the policy and an additional hierarchical structure associated with the landing page. The hierarchical structure represents a structure of at least a portion of the web page and the additional hierarchical structure represents a structure of a corresponding portion of the landing page. The online system compares the hierarchical structure and additional hierarchical structure. Based on the comparison, the online system computes a measure of dissimilarity between the hierarchical structure and additional hierarchical structure and determines a likelihood the landing page violates the policy based on the measure of dissimilarity.

20 Claims, 9 Drawing Sheets

(56) References Cited

U.S. PATENT DOCUMENTS

| | | | | |
|---|---|---|---|---|
| 8,627,442 | B2* | 1/2014 | Ji | H04L 63/02 |
| | | | | 726/11 |
| 8,788,442 | B1* | 7/2014 | Sculley, II | G06N 20/00 |
| | | | | 706/20 |
| 9,386,037 | B1* | 7/2016 | Hunt | H04L 63/1433 |
| 10,013,500 | B1* | 7/2018 | McClintock | G06F 11/3006 |
| 10,713,586 | B2* | 7/2020 | Lim | H04L 63/20 |
| 2006/0116918 | A1* | 6/2006 | Flora | G06Q 10/1095 |
| | | | | 705/7.19 |
| 2010/0121850 | A1* | 5/2010 | Moitra | G06F 16/95 |
| | | | | 707/E17.107 |
| 2012/0096389 | A1* | 4/2012 | Flam | G06F 16/168 |
| | | | | 715/777 |
| 2014/0181125 | A1* | 6/2014 | Moitra | G06F 16/35 |
| | | | | 707/749 |
| 2018/0191764 | A1* | 7/2018 | Chawla | G06F 16/951 |
| 2020/0204587 | A1* | 6/2020 | Hunt | G06F 21/128 |

\* cited by examiner

DETECTING A LANDING PAGE THAT VIOLATES AN ONLINE SYSTEM POLICY BASED ON A STRUCTURAL SIMILARITY BETWEEN THE LANDING PAGE AND A WEB PAGE VIOLATING THE POLICY

CROSS REFERENCE TO RELATED APPLICATIONS

This application is a division of co-pending U.S. application Ser. No. 15/686,060, filed Aug. 24, 2017, which is incorporated by reference in its entirety.

BACKGROUND

This disclosure relates generally to online systems, and more specifically to detecting violation of an online system policy by a landing page associated with content received by an online system for presentation to users of the online system.

Online systems, such as social networking systems, allow online system users to connect to and to communicate with other online system users. Users may create profiles on an online system that are tied to their identities and include information about the users, such as interests and demographic information. The users may be individuals or entities such as corporations or charities. Online systems allow users to easily communicate and to share content with other users by providing content items to an online system for presentation to the other users. Content items provided to an online system by a user may include declarative information about the user, status updates, check-ins to locations, images, photographs, videos, text data, or any other information the user wishes to share with additional users of the online system. An online system may also generate content items for presentation to a user, such as content items describing actions taken by other users on the online system.

Many online systems allow users (e.g., businesses) to sponsor presentation of content on an online system to gain public attention for a user's products or services or to persuade other users to take an action regarding the user's products or services. Content for which an online system receives compensation in exchange for presenting to users is referred to as "sponsored content." Additionally, many online systems receive compensation from a user for presenting online system users with certain types of sponsored content provided by the user. Frequently, online systems charge a user for each presentation of a sponsored content item to an online system user or for each interaction with a sponsored content item by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

Online systems often maintain content management policies to ensure that content items received for presentation by the online systems are suitable for audiences to which the content items are to be presented. For example, an online system evaluates a content item received by the online system for presentation to online system users against a set of content management policies prohibiting or restricting presentation of certain types of content, such as content promoting illegal products, services or activities. Content management policies prohibiting or restricting presentation of certain types of content are often associated with various corrective actions that may be performed by an online system if the online system determines the content item violates a policy. For example, an online system may disallow the presentation of a content item determined to violate a policy or issue a warning to an online system user who provided the content item to the online system, giving the user an opportunity to revise the content item to be in compliance with the policy.

Content items that are otherwise determined to comply with a content management policy may still violate the policy if the content items include a link to a web page external to the online system that violates the policy. For example, although a status update provided to an online system by a user describes subject matter that complies with a policy prohibiting content encouraging criminal activities, the policy may still be violated if the status update includes a link to a web page that encourages a criminal activity. Thus, an online system that maintains content management policies restricting or prohibiting presentation of certain types of content by the online system may evaluate content items received by the online system to determine whether the content items include a link to a web page external to the online system that violates a content management policy. If an online system detects a link in a content item to a web page that violates a content management policy, the online system may perform a corrective action associated with the content item to prevent presentation of the content item and/or link included in the content item.

However, conventional methods for determining whether content management policies are violated by web pages accessible via links included in content items are often resource intensive. For example, to detect a web page that violates a policy, the web page must first be reported to the online system as allegedly violating the policy, queued for review by the online system, and manually reviewed to confirm whether the web page actually violates the policy, which is a time consuming process. Additionally, even if an online system confirms a web page violates a policy and prevents presentation of content items including a link to the web page, the online system's efforts are often susceptible to subversion by bad actors intent on undermining the policy. For example, a bad actor attempting to undermine the policy of the previous example may easily create multiple new web pages that each violate the policy and overwhelm the online system with additional content items including links to each new web page. If the online system of the preceding example is to successfully enforce the policy, the online system must expend an increasing amount of additional resources to detect each new web page before the additional content items including links to the new web pages are presented. As such, there is a need for improvements that would allow an online system to more quickly and efficiently detect policy-violating web pages that are accessible via links included in content items received by an online system.

SUMMARY

An online system evaluates content received by the online system for presentation to online system users against a set of content management policies prohibiting or restricting presentation of certain types of content. For example, content management policies maintained by the online system prohibit presentation of content encouraging criminal activities and restrict presentation of content relating to adult activities. In various embodiments, the online system evaluates content items received by the online system to determine whether the content items include a link to content external to the online system, such as a web page on a third-party system or a component of the web page, violating one or more policies of the online system. For example, the online system determines an advertisement provided to the online system for presentation to online system users violates an advertising policy if the online system detects a link in the advertisement to a landing page promoting illegal products, services or activities. In various embodiments, the online system determines a likelihood a link to content external to the online system included in a content item violates an online system policy based on a structural similarity between a landing page associated with the link and one or more web pages known or suspected by the online system to contain content violating the policy.

To detect a landing page that violates an online system policy based on a structural similarity between the landing page and a web page known or suspected to violate the policy, the online system receives information describing web pages external to the online system and evaluates the information against one or more content management policies maintained by the online system. For example, the online system accesses a web page external to the online system and determines whether text, images, videos or any other content included in the web page violates one or more policies. Content management policies that may be violated by a web page or content included in the web page include policies that restrict or prohibit presentation of subject matter involving bullying, criminal activity, hate speech, malware, nudity, regulated goods, spam, threats, and any other subject matter that may be deemed by the online system unsuitable for presentation to users.

A classification identifier associated with a web page identifies the web page to the online system as a web page determined to violate or not violate a particular policy. If the online system determines a web page or content included in the web page violates a policy, the online system associates a "policy-violating" classification identifier with the web page and stores the classification identifier along with page data describing the web page and violated policy, in various embodiments. For example, page data stored in association with a classification identifier identifying web pages determined to violate a policy includes a network address (e.g., a URL) of a web page, a description of one or more components of the web page violating the policy, and a description of the violated policy. Additionally, or alternatively, if the online system determines a web page or content included in the web page does not violate a policy, the online system associates a "policy-compliant" classification identifier with the web page and stores the classification identifier along with page data describing the web page and policy, in some embodiments. For example, page data stored in association with a classification identifier identifying web pages determined to not violate one or more policies includes a network address (e.g., a URL) of a web page, a description of one or more components of the web page not violating a policy, and a description of the one or more policies not violated. Hence, in various embodiments, a classification identifier associated with each web page identifies the web page to the online system as a web page determined to either violate or not violate a particular content management policy.

For each web page determined to violate a content management policy, the online system determines a hierarchical structure associated with the web page and stores information describing the hierarchical structure with the page data describing the web page. If the online system stores page data describing web pages determined to not violate a content management policy, the online system may also determine and store a hierarchical structure associated with each web page determined to not violate the policy, in some embodiments. A hierarchical structure determined by the online system and associated with a web page represents a structural composition of at least a portion of the web page. For example, a hierarchical structure is a schematic representation of a markup language document corresponding to a web page that illustrates various elements of the markup language document and relationships between the elements. In some embodiments, a hierarchical structure represents an entire web page, while in other embodiments the hierarchical structure represents only a portion of the web page.

In various embodiments, each hierarchical structure determined by the online system and associated with a web page is a Document Object Model (DOM) tree having a plurality of nodes representing elements of a markup language document presented as the web page by a web browser executing on a client device 110. In certain embodiments, certain nodes of the hierarchical structure are connected by edges representing relationships between the nodes such that a root node of the hierarchical structure is connected to other nodes of the hierarchical structure via branch-like paths of nodes and edges. In some embodiments, some nodes of the hierarchical structure correspond to elements displayed in a web page by a web browser (e.g., URL links, buttons, images, etc.), while other nodes may not correspond to visually represented elements (e.g., audio data, metadata, tracking pixels, etc.). Hence, for each web page and content management policy violated and, in some embodiments, not violated by the web page, the online system determines a hierarchical structure associated with the web page and stores information describing the hierarchical structure along with the page data describing the web page and policy.

If the online system receives a content item from a user of the online system for presentation to additional users by the online system, the online system determines whether the content item includes a link to a landing page external to the online system. For example, if the online system receives a status update from an online system user with a request to present the status update to additional users connected to the user on the online system, the online system determines whether the status update includes a link to a landing page external to the online system before presenting the status update. In some embodiments, the content item is a sponsored content item for which the online system receives compensation in exchange for presenting to a user, while in other embodiments the content item is an organic content item for which the online system does not receive compensation in exchange for presenting to the user. Example types of content items that may be received by the online system for presentation which may include a link to a landing page external to the online system include location check-ins, posts, status updates, images, audio, videos, articles, advertisements, and any other suitable content a user of the online system may wish to share with an additional user of the online system.

If the online system determines the received content item includes a link to a landing page external to the online system, the online system identifies the landing page associated with the link and determines whether the landing page corresponds to a web page described by the stored page data. For example, the online system identifies a network address (e.g., a URL) of the landing page and determines whether the network address corresponds to a network address described by information included in the stored page data describing a web page determined to violate or not violate one or more content management policies maintained by the online system. If the landing page corresponds to a web page described by the stored page data, the online system identifies the classification identifier stored in association with the page data to determine whether the landing page violates one or more policies violated or not violated by the web page, in some embodiments. For example, if the landing page corresponds to a web page described by stored page data including a "policy-violating" classification identifier and a description of an anti-malware policy violated by the web page, the online system determines the landing page also violates the anti-malware policy. As another example, if the landing page corresponds to a web page described by stored page data including a "policy-compliant" classification identifier associated with an anti-harassment policy, the online system determines the landing page does not violate the anti-harassment policy.

If the landing page is determined to violate a content management policy based on information included in stored page data describing a corresponding web page, the online system may perform one or more corrective actions associated with the received content item. For example, the online system may disallow presentation of the content item or issue a warning to an online system user from whom the content item was received, giving the user an opportunity to revise the content item to be in compliance with the online system's content management policies. In some embodiments, if the online system determines the landing page does not violate a content management policy based on information included in stored page data describing a corresponding web page, the online system stores the content item for later retrieval. For example, the content item may be stored for possible subsequent selection for presentation to online system users meeting certain targeting criteria. Additional actions may be performed by the online system based on a determination the landing page violates or does not violate a particular content management policy, as later described in more detail.

If the landing page does not correspond to a web page described by the stored page data (i.e., is not a web page already determined by the online system to violate or not violate a content management policy), the online system determines an additional hierarchical structure associated with the landing page. In various embodiments, the additional hierarchical structure associated with the landing page represents a structural composition of at least a portion of the landing page corresponding to the portion of each web page represented by each hierarchical structure determined by the online system and described by the stored page data. For example, if each hierarchical structure represents an entire web page, the online system determines an additional hierarchical structure representing the entire landing page. Additionally, a type of representation of the additional hierarchical structure corresponds to the type of representation of each hierarchical structure described by the stored page data. Thus, if the hierarchical structure associated with each policy-violating and/or policy-compliant page described by the stored page data is a DOM tree, the additional hierarchical structure is also a DOM tree.

In various embodiments, the additional hierarchical structure determined by the online system is a schematic representation of a structure of the landing page, which includes a plurality of nodes representing elements of a markup language document presented as the landing page in a web browser executing on a client device 110. As with each hierarchical structure, various nodes of the additional hierarchical structure are connected by edges representing relationships between the nodes such that a root node of the additional hierarchical structure is connected to other nodes via branch-like paths of nodes and edges. Further, some nodes of the additional hierarchical structure correspond to elements of a markup language document that are displayed in the landing page via a web browser (e.g., text boxes, selectable links, images, etc.), while other nodes may not correspond to elements visually represented in the landing page (e.g., audio data, metadata, tracking pixels, etc.).

In various embodiments, the online system compares the additional hierarchical structure and a hierarchical structure associated with each web page of a set of web pages described by the stored page data to determine a measure of dissimilarity between the hierarchical structure and additional hierarchical structure. For example, based on the measure of dissimilarity between the additional hierarchical structure and a hierarchical structure associated with a web page determined to violate a particular content management policy, the online system determines a likelihood the landing page also violates the policy, as later described in more detail. In some embodiments, the online system compares the hierarchical structure and additional hierarchical structure by comparing a set and additional set of characters generated by the online system representing the hierarchical structure and additional hierarchical structure, respectively. For example, the online system generates and compares a set of values (e.g., a hash) representing at least a portion of the hierarchical structure and an additional set of values (e.g., an additional hash) representing a corresponding portion of the additional hierarchical structure.

In some embodiments, a set of characters generated by the online system representing a hierarchical structure includes multiple subsets of characters that each represent a node of the hierarchical structure. Likewise, an additional set of characters generated by the online system representing the additional hierarchical structure includes multiple subsets of characters that each represent a node of the additional hierarchical structure, in some embodiments. In such embodiments, the online system compares a subset of characters from the set of characters and an additional subset of characters from the additional set of characters to determine a difference between a node of the hierarchical structure represented by subset of characters and an additional node of the additional hierarchical structure represented by additional subset of characters. Since a subset of characters represents a node of the hierarchical structure and an additional subset of characters represents a node of the additional hierarchical structure, a difference between the subset and additional subset indicates a difference between nodes of the hierarchical structure and additional hierarchical structure and, therefore, a difference between the hierarchical structure and additional hierarchical structure.

In some embodiments, the online system compares every node of a hierarchical structure and additional hierarchical structure, while in other embodiments the online system compares truncated portions of the hierarchical structure and additional hierarchical structure. For example, rather than comparing a set and additional of characters representing the entire hierarchical structure and additional hierarchical structure, the online system truncates the hierarchical structure and additional hierarchical structure and generates a set and additional set of characters representing truncated portions of the hierarchical structure and additional hierarchical structure, which are then compared. In such embodiments, the truncated portions of the hierarchical structure and additional hierarchical structure include fewer than every node of the hierarchical structure and additional hierarchical structure, allowing the online system to more quickly compare representative portions of the hierarchical structure and additional hierarchical structure. For example, a comparison of truncated portions of the hierarchical structure and additional hierarchical structure utilizes fewer computing resources than are utilized when comparing the entire hierarchical structure and additional hierarchical structure. In some embodiments, the online system conserves computing resources by comparing large portions of the hierarchical structure and additional hierarchical structure only if preliminary comparison of truncated portions of the hierarchical structure and additional hierarchical structure indicate a more thorough comparison is warranted. For example, if the online system detects fewer than a threshold number of differences between truncated portions of a hierarchical structure and the additional hierarchical structure (indicating a possible high degree of similarity between the hierarchical structure and additional hierarchical structure), the online system performs a more complete and precise comparison of the entire hierarchical structure and additional hierarchical structure.

Based on the comparison of the set and additional set of characters representing the hierarchical structure and additional hierarchical structure, the online system computes a measure of dissimilarity between the hierarchical structure and additional hierarchical structure. In various embodiments, the measure of dissimilarity computed by the online system is a minimum edit distance between the hierarchical structure and additional hierarchical structure describing a minimum number of edits required to make at least the compared portion of the hierarchical structure identical to the corresponding portion of the additional hierarchical structure. For example, the online system generates and compares a fuzzy hash representing one or more nodes and edges of the hierarchical structure and an additional fuzzy hash representing one or more nodes and edges of the additional hierarchical structure; based on the comparison, the online system computes a Hamming distance between the fuzzy hash and additional fuzzy hash. In the previous example, the computed Hamming distance describes a minimum number of substitutions required to make the fuzzy hash and additional fuzzy hash identical and, therefore, a minimum number of edits required to make the compared nodes and edges of the hierarchical structure and additional hierarchical structure identical.

In some embodiments, the online system conserves computing resources by computing a measure of dissimilarity between entire portions of the hierarchical structure and additional hierarchical structure only if a preliminary measure of dissimilarity between truncated portions of the hierarchical structure and additional hierarchical structure indicate a more precise measure of dissimilarity is desirable. For example, if a preliminary measure of dissimilarity between truncated portions of the hierarchical structure and additional hierarchical structure is below a threshold value (indicating a possible high degree of similarity between the hierarchical structure and additional hierarchical structure), the online system computes a more precise measure of dissimilarity between larger portions of the hierarchical structure and additional hierarchical structure. Hence, in various embodiments, the online system computes a measure of dissimilarity between at least a portion of the hierarchical structure and additional hierarchical structure based on a determined minimum edit distance between nodes and/or edges of the hierarchical structure and additional hierarchical structure.

Based on the computed measure of dissimilarity between the hierarchical structure and additional hierarchical structure, the online system determines a likelihood the landing page violates one or more policies violated by the web page associated with the hierarchical structure. In various embodiments, the likelihood the landing page violates a policy is inversely proportional to the measure of dissimilarity between a hierarchical structure associated with a web page that violates the policy and the additional hierarchical structure. For example, if the computed measure of dissimilarity is a minimum edit distance between a hierarchical structure associated with a web page violating a policy and the additional hierarchical structure, the online system determines there is a greater likelihood the landing page violates the policy if the measure of dissimilarity is 12 than if the measure of dissimilarity is 70. In some embodiments, the online system compares the computed measure of dissimilarity to a threshold measure of dissimilarity and determines it is likely the landing page violates one or more content management policies violated by the web page associated with the hierarchical structure if the computed measure of dissimilarity is below the threshold measure of dissimilarity. Conversely, the online system determines it is not likely the landing page violates one or more content management policies violated by the web page associated with the hierarchical structure if the computed measure of dissimilarity is at least the threshold measure of dissimilarity, in some embodiments.

In alternative embodiments, the online system determines a likelihood the landing page violates a policy based on multiple computed measures of dissimilarity between the additional hierarchical structure and a hierarchical structure associated with each of multiple web pages described by stored page data. For example, the online system computes a measure of dissimilarity between the additional hierarchical structure and hierarchical structures associated with a set of web pages violating a content management policy and an additional set of web pages not violating the policy. Continuing this example, the online system identifies web pages associated with hierarchical structures having below a threshold measure of dissimilarity with the additional hierarchical structure and retrieves page data describing the web pages to determine classification identifiers associated with a majority of the web pages. If, in the previous example, a majority of web pages associated with the retrieved page data are associated with "policy-violating" classification identifiers, the online system determines there is at least a threshold likelihood the landing page violates the policy. Conversely, if a majority of web pages associated with the retrieved page data are associated with "policy-compliant" classification identifiers, the online system determines there is at least a threshold likelihood the landing page does not violate the policy.

In another embodiment, the online system identifies a specified number of hierarchical structures having a smallest measure of dissimilarity in common with the additional hierarchical structure and retrieves page data describing web pages associated with the hierarchical structures. Based on classification identifiers included in the retrieved page data, the online system determines a likelihood the landing page violates a policy violated or not violated by a majority of the described web pages. For example, using a K nearest neighbors algorithm, the online system identifies K hierarchical structures having the smallest computed measures of dissimilarity in common with the additional hierarchical structure and classifies the landing page according to the classification identifier associated with the majority of web pages represented by the identified hierarchical structures. Thus, in the preceding example, if a majority of the identified hierarchical structures are associated with web pages associated with a "policy-violating" classification identifier, the online system determines there is at least a threshold likelihood the landing page violates the policy violated by the majority of web pages.

In other embodiments, the online system uses multiple computed measures of dissimilarity between hierarchical structures associated with web pages violating a policy and/or web pages not violating the policy as training data to train a machine-learned predictive model to output a likelihood the landing page violates the policy. For example, the online system uses one or more machine learning techniques to determine associations and strengths of associations among measures of dissimilarity between hierarchical structures associated with web pages violating a policy and hierarchical structures associated with web pages not violating the policy. One or more additional features associated with the web pages may also be used to train the predictive model. For example, additional features may include a height or breadth of the hierarchical structure associated with a web page, a content publisher presenting the web page, an online system user associated with the web page, an online system policy violated or not violated by the web page, etc. Based on strengths of the determined associations included in the training data and one or more input features describing the landing page, the trained predictive model outputs information describing a likelihood the landing page violates the policy.

In various embodiments, at least one input feature used by the predictive model to predict the likelihood the landing page violates the policy is a computed measure of dissimilarity between the additional hierarchical structure and one or more hierarchical structures associated with web pages violating the policy and/or web pages not violating the policy. In such embodiments, the online system provides the trained predictive model with a computed measure of dissimilarity between the additional hierarchical structure and at least one hierarchical structure associated with a web page described by the stored page data as an input feature and receives an output from the model describing a likelihood the landing page violates the policy. Additional input features that may be used by the trained predictive model to output a likelihood the landing page violates the policy include various types of data describing the additional hierarchical structure, the policy, an online system user and/or third party system associated with the landing page, a subject matter of the landing page, etc. The online system receives the output information from the predictive model and determines a likelihood the landing page violates the policy based on the received information. For example, based on a received probability ratio describing a probability the landing page violates the policy, the online system determines it is either likely or not likely the landing page violates the policy.

If the online system determines it is likely the landing page violates a policy or there is at least a threshold likelihood the landing page violates the policy, the online system performs one or more corrective actions associated with the content item and/or an online system user account associated with a user from whom the content item was received, in various embodiments. Example types of corrective actions that may be performed by the online system include queuing the content item for manual review, disallowing presentation of the content item, communicating a warning to the user from whom the content item was received, and suspending an account on the online system associated with the user. For example, upon determining there is at least a threshold likelihood the landing page violates a policy, the online system disallows presentation of the content item including the link to the landing page unless and until a manual review of the landing page results in a determination the landing page complies with the policy. In the previous example, the online system may also send a warning to a client device 110 associated with the user from whom the content item was received, giving the user an opportunity to correct any component of the landing page suspected of violating the policy.

In some embodiments, if the online system determines it is not likely the landing page violates a policy or there is less than a threshold likelihood the landing page violates the policy, the online system stores the content item for subsequent retrieval. For example, the online system associates a "policy-compliant" classification identifier with the landing page and stores page data describing the landing page in the page data store with the classification identifier. In this example, the additional hierarchical structure may be subsequently retrieved by the online system and used in determining whether additional landing pages violate the policy not violated by the landing page. As another example, the content item is stored in the content store for possible selection by the online system for presentation to online system users meeting certain targeting criteria associated with the content item. Hence, the online system determines a likelihood the landing page violates a content management policy based on a structural similarity between the landing page and one or more web pages determined to violate or not violate the policy and may perform one or more corrective actions based on the determination.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
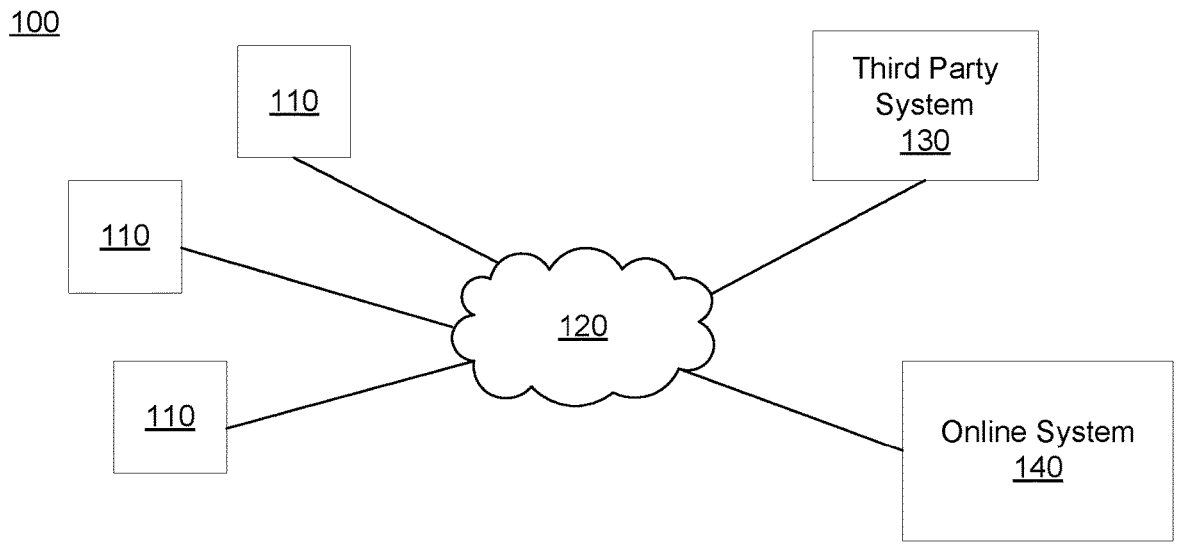
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems that are content sharing networks or other online systems 140 providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 for presenting the advertisements to the online system 140. Other types of sponsored content may be provided by a third party system 130 to the online system 140 for presentation by the online system 140 in exchange for compensation from the third party system 130. Sponsored content from a third party system 130 may be associated with the third party system 130 or with an entity on whose behalf the third party system 130 operates.

In some embodiments, one or more of the third party systems 130 is a trusted third party system 130 that provides data analysis services to the online 140. For example, a third party system 130 is an entity, such as a data analytics provider, that receives information describing actions performed by users of the online system 140 from the online system 140 or one or more entities external to the online system 140. In various embodiments, the third party system 130 receives information describing actions associated with electronic content presented to various audiences by various content publishers and identifies individuals who performed the actions. In some embodiments, the third party system 130 compiles information describing the actions and the individuals who performed them, and provides the information to the online system 140 as a performance metric or as raw data, which the online system 140 utilizes for generation of a performance metric, as described in more detail in conjunction with FIG. 3 below.

Figure 2:
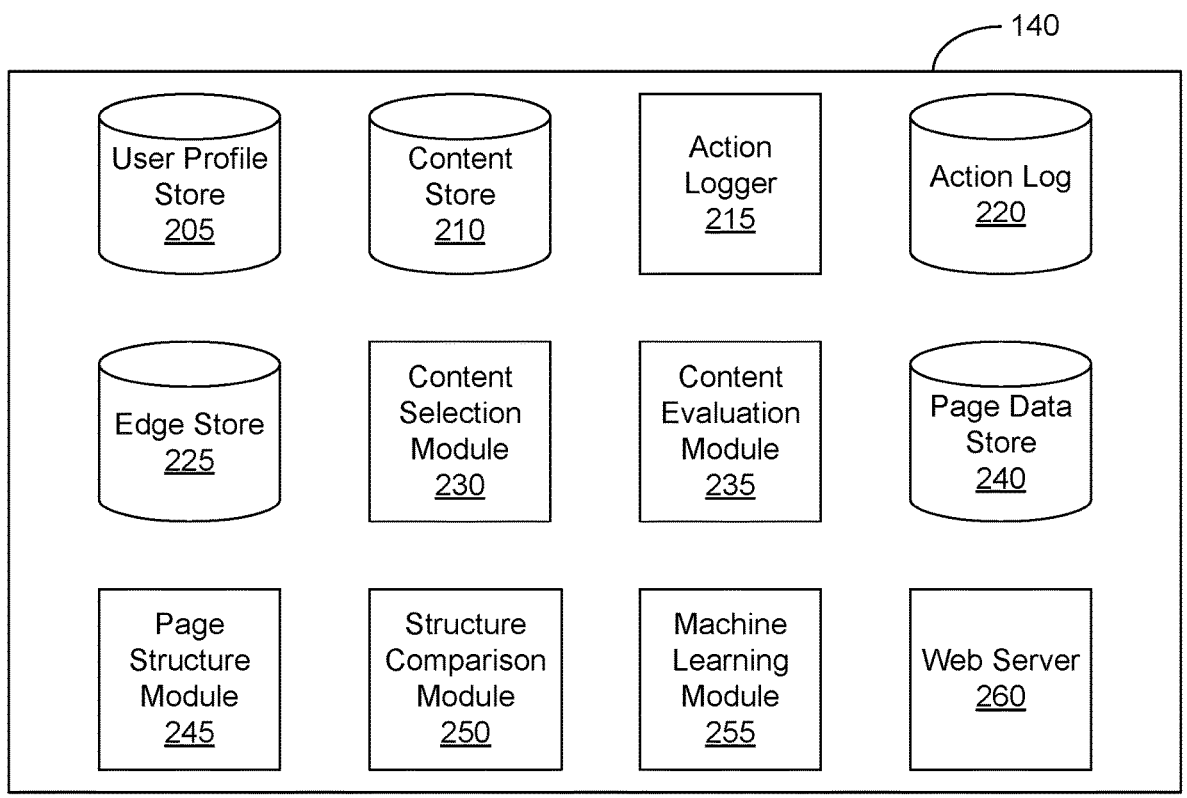
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a content evaluation module 235, a page data store 240, a page structure module 245, a structure comparison module 250, a machine learning module 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a publishing user who provided the content item to the online system 140 and is used to determine an expected value, such as monetary compensation, provided by the publishing user to the online system 140 if content in the content item is presented to an additional user, if the content in the content item receives a user interaction when presented, or if any suitable condition is satisfied when content in the content item is presented to an additional user. For example, the bid amount included in a content item specifies a monetary amount that the online system 140 receives from a publishing user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a publishing user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the publishing user who provided the content item to the online system 140. Targeting criteria included in a content item request specify one or more characteristics of users eligible to be presented with the content item. For example, targeting criteria are used to identify users having user profile information, connections, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features that each represent characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having a highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount associated with the content item and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content (also referred to as a "content feed") to a user of the online system 140. The feed may include one or more content items associated with bid amounts (i.e., "sponsored content items") as well as organic content items, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. One or more content items associated with bid amounts may be included in the feed. The content selection module 230 may also determine an order in which selected content items are presented via the feed. For example, the content selection module 230 orders content items in the feed based on likelihoods of the user interacting with various content items.

The content evaluation module 235 evaluates information received by the online system 140 describing web pages external to the online system 140 and/or content included in the web pages against various content management policies maintained by the online system 140. For example, the content evaluation module 235 accesses multiple web pages external to the online system 140 and, for each web page, determines whether text, images, videos or any other content included in the web page violates each policy of a set of content management policies maintained by the online system 140. Example types of information describing a web page and/or content included in the web page evaluated by the content evaluation module 235 includes a network address (e.g., a URL) of a web page, a markup language document associated with the web page, an online system user or entity associated with the web page, and a description of text, audio data, video data, and images presented by the web page.

In some embodiments, the information describing a web page and/or content included in the web page is received from an entity that publishes or is otherwise associated with the web page, while in other embodiments the information is received from a third party system 130 that compiles information describing various web pages published by various content publishers and provides the information to the online system 140. For example, the online system 140 receives a table of data from a data analytics provider describing various attributes associated with multiple web pages published by various third-party content publishers. In the preceding example, the data describing the various attributes may include, for example, a number, size, type and subject matter of videos, images and other media included in each web page.

In one embodiment, information describing a web page external to the online system 140 may be communicated to the online system 140 by a client device 110 or an application executing on the client device 110 when a user of the client device 110 accesses the web page via the client device 110. For example, the online system 140 receives information describing a network address (e.g., a URL) of a web page and content presented by the web page via an application associated with the online system 140 executing on a client device 110 if a user of the client device 110 logs into the online system 140 via the application and uses the client device 110 to visit the web page while logged into the online system 140. In other embodiments, the information describing a web page and/or content included in the web page is received directly from a web page accessed by the content evaluation module 235. For example, the content evaluation module 235 accesses a web page presented by a third-party system and determines information describing the web page, such as a network address (e.g., a URL) of the web page, types of content presented by the web page, and a subject matter of the content.

Content management policies maintained by the online system 140 against which the received information is evaluated include various policies prohibiting or restricting presentation of certain types of content and/or subject matter by the online system 140. For example, certain content management policies restrict presentation of content relating to adult activities (e.g., gambling, smoking, alcohol use, etc.). As another example, content management policies prohibit presentation of sexually suggestive content and content that promotes illegal products, services or activities. Additional content management policies that may be violated by a web page or content included in the web page include policies that restrict or prohibit presentation of subject matter involving, for example, bullying, criminal activity, hate speech, malware, nudity, regulated goods, spam, threats, and any other subject matter that may be deemed by the online system 140 unsuitable for presentation to users of the online system 140.

In various embodiments, the content evaluation module 235 associates a classification identifier with each web page described by the received information based on a determination of whether the web page or content included in the web page violates one or more content management policies. For example, if the content evaluation module 235 determines content included in a web page violates a policy prohibiting discriminatory practices, the content evaluation module 235 associates a "policy-violating" classification identifier with the web page, identifying the web page to the online system 140 as a web page determined to violate the policy. Continuing the preceding example, if the content evaluation module 235 determines the web page does not violate the policy, the content evaluation module 235 associates a "policy-compliant" classification identifier with the web page, identifying the web page to the online system 140 as a web page determined to not violate the policy. Associating a classification identifier with a web page allows the online system 140 to index information describing the web page by the result of the content evaluation module's determination of whether the web page violates a particular policy. For example, the online system 140 uses the "policy-violating" classification identifier to retrieve page data stored in association with the identifier describing a set of web pages determined to violate a policy.

In some embodiments, each policy maintained by the online system 140 is associated with a set of policy-specific classification identifiers, such as a policy-specific "policy-violating" classification identifier and a policy-specific "policy-compliant" classification identifier. In such embodiments, the content evaluation module 235 may associate multiple classification identifiers with a web page based on a determination of whether the web page and/or content included in the web page violates a set of multiple policies. For example, a "policy-violating" classification identifier associated with a first policy is associated with a web page violating the first policy and a "policy-violating" classification identifier associated with a second policy is associated with a web page violating the second policy. As another example, a web page associated with a "policy-violating" classification identifier associated with a first policy and a "policy-compliant" classification identifier associated with a second policy identifies the web page as a web page violating the first policy and not violating the second policy.

In various embodiments, the content evaluation module 235 stores the classification identifier associated with a web page along with the received information describing the web page and additional information determined by the content evaluation model as page data in the page data store 240, as described in more detail below. For example, page data includes received and determined information describing a web page, a classification identifier and hierarchical structure associated with the web page, and one or more content management policies violated or not violated by the web page. Hence, the content evaluation module 235 receives information describing web pages external to the online system 140, determines whether the web pages and/or content included in the web pages violate one or more policies maintained by the online system 140, and stores information describing the web pages with a classification identifier describing the result of the determination.

In various embodiments, the content evaluation module 235 also identifies landing pages associated with links included in content items received by the online system 140 and determines whether the landing pages correspond to one or more web pages described by stored page data. For example, the content evaluation module 235 identifies a network address (e.g., a URL) of a landing page accessible via a link included in a content item received from an online system user and determines whether the network address corresponds to a network address described by information included in stored page data. In the previous example, if the network address of the landing page corresponds to a network address described by information included in the stored page data, the content evaluation module 235 determines the landing page and web page are the same.

If the content evaluation module 235 determines a landing page corresponds to a web page described by information included in stored page data, the content evaluation module 235 determines whether the landing page violates one or more policies violated or not violated by the web page based on the classification identifier associated with the web page. For example, if the content evaluation module 235 determines the landing page corresponds to a web page associated with a "policy-violating" classification identifier, the online system 140 determines the landing page violates a policy violated by the web page. In the previous example, the content evaluation module 235 may identify the policy violated by the landing page based on a description of the policy included in the page data associated with the web page and/or the policy associated with the classification identifier. As another example, if the content evaluation module 235 determines the landing page corresponds to a web page associated with a "policy-violating" classification identifier associated with a first policy and a "policy-compliant" classification identifier associated with a second policy, the content evaluation module 235 determines the landing page violates the first policy and does not violate the second policy.

If the landing page is determined to violate a policy, the content evaluation module 235 may associate a "policy-violating" classification identifier with the landing page and store information describing the landing page along with the classification identifier, in some embodiments. Additionally, the content evaluation module 235 may queue a landing page determined to violate a policy for manual review by the online system 140 and/or performance of a corrective action associated with the content item including the link to the landing page or online system user account associated with an online system user who provided the content item. Similarly, in some embodiments, the content evaluation module 235 may associate a "policy-compliant" classification identifier with the landing page and store information describing the landing page along with the classification identifier if the landing page is determined to not violate a policy. Additionally, the content evaluation module 235 may store the content item including the link to the landing page determined to not violate the policy (e.g., in the content store 210) for later retrieval, in various embodiments.

In various embodiments, the online system 140 stores information describing web pages determined to violate or not violate one or more content management policies maintained by the online system 140 in the page data store 240. Page data stored in the page data store 240 includes information received by the online system 140 describing web pages external to the online system 140 and additional information determined by the online system 140 also describing the web pages. Example types of information received or determined by the online system 140 describing a web page and stored as page data in the page data store 240 include information describing a network address (e.g., a URL) of a web page, a markup language document associated with the web page, an online system user or entity associated with the web page, a subject matter of the web page, and text, audio, video, and images presented by the web page.

In some embodiment, page data stored in the page data store 240 for each web page described by information received by the online system 140 also describes various content management policies maintained by the online system 140 determined to be violated or not violated by the web page. For example, page data stored in the page data store 240 for a web page determined to violate a policy includes information describing a "policy-violating" classification identifier associated with the web page, a network address (e.g., a URL) of the web page, a description of one or more components of the web page violating the policy, and a description of the violated policy. As another example, page data stored in the page data store 240 for a web page determined to not violate a policy includes information describing a "policy-compliant" classification identifier, a network address (e.g., a URL) of the web page, a description of one or more components of the web page that do not violate the policy, and a description of the policy.

In various embodiments, page data stored in the page data store 240 for each web page described by information received by the online system 140 also describes a hierarchical structure associated with the web page. As described in more detail below, a hierarchical structure associated with a web page is a determined representation of a structural composition of at least a portion of the web page. For example, information stored in the page data store 240 as page data for a web page includes information describing a Document Object Model tree determined by the online system 140 representing various elements of a markup language document presented as the web page by a web browser and relationships between the elements. Hence, the page data store 240 includes page data comprising received and/or determined information describing multiple web pages external to the online system 140 and one or more content management policies violated or not violated by each web page.

The page structure module 245 determines hierarchical structures associated with web pages external to the online system 140 and stores information describing the hierarchical structures along with page data describing the web pages. In various embodiments, a hierarchical structure determined by the page structure module 245 represents a structural composition of at least a portion of a web page for which the hierarchical structure is determined. For example, a hierarchical structure is a schematic representation of a markup language document corresponding to a web page that illustrates various elements of the markup language document and relationships between the elements as presented by a web browser on a client device 110. In some embodiments, the page structure module 245 determines a hierarchical structure representing a structural composition of an entire web page, while in other embodiments the hierarchical structure represents a structural composition of only a portion of the web page.

In various embodiments, each hierarchical structure determined by the page structure module 245 is a Document Object Model (DOM) tree having a plurality of nodes representing elements of a markup language document comprising the web page as presented by a web browser executing on a client device 110. In such embodiments, certain nodes of each hierarchical structure determined by the page structure module 245 are connected by edges representing relationships between the nodes such that a root node of the hierarchical structure is connected to other nodes of the hierarchical structure via branch-like paths of nodes and edges. In some embodiments, some nodes of a hierarchical structure correspond to elements that are displayed in a web page by a web browser executing on a client device 110 (e.g., URL links, buttons, images, text, columns, etc.), while other nodes may correspond to elements that are not visually represented in the web page (e.g., audio, metadata, tracking pixels, etc.). Additionally, each hierarchical structure has a height and breadth that are dependent on the number of nodes, edges and relationships between nodes and edges of the hierarchical structure.

In some embodiments, the page structure module 245 determines and stores a hierarchical structure for each web page determined by the content evaluation module 235 to violate one or more content management policies maintained by the online system 140. For example, if the content evaluation module 235 determines a web page described by information received by the online system 140 violates a content management policy, the page structure module 245 determines a hierarchical structure associated with the web page and stores information describing the hierarchical structure with page data describing the web page and violated policy. In other embodiments, the page structure module 245 additionally or alternatively determines and stores a hierarchical structure for each web page determined to not violate one or more content management policies.

In various embodiments, the page structure module 245 also determines additional hierarchical structures associated with landing pages accessible via links included in content items received by the online system 140. For example, if the content evaluation module 235 determines a landing page associated with a link included in a received content item does not correspond to a web page described by stored page data, the page structure module 245 determines an additional hierarchical structure associated with the landing page. In the preceding example, the additional hierarchical structure may be subsequently compared with a hierarchical structure associated with one or more web pages described by the stored page data to determine a likelihood the landing page violates a policy violated by the one or more web pages, as described in more detail below.

An additional hierarchical structure determined by the page structure module 245 represents a structural composition of at least a portion of a landing page corresponding to the portion of a web page represented by each determined hierarchical structure. Similar to each hierarchical structure, an additional hierarchical structure is a schematic representation of a markup language document corresponding to a landing page that illustrates various elements of the markup language document and relationships between the elements as presented by a web browser executing on a client device 110. Additionally, a type of representation of an additional hierarchical structure corresponds to the type of representation of each determined hierarchical structure. Thus, if a hierarchical structure associated with each policy-violating and/or policy-compliant page described by the stored page data is a DOM tree, an additional hierarchical structure associated with a landing page is also a DOM tree.

As with each hierarchical structure, various nodes of an additional hierarchical structure are connected by edges representing relationships between the nodes such that a root node of the additional hierarchical structure is connected to other nodes via branch-like paths of nodes and edges. In some embodiments, some nodes of an additional hierarchical structure correspond to elements that are displayed in a landing page by a web browser executing on a client device 110 (e.g., URL links, buttons, images, text, columns, etc.), while other nodes may correspond to elements that are not visually represented in the landing page (e.g., audio, metadata, tracking pixels, etc.). Further, each additional hierarchical structure determined by the page structure module 245 has a height and breadth that are dependent on the number of nodes, edges and relationships between the nodes and edges of the additional hierarchical structure. Hence, the page structure module 245 determines and stores hierarchical structures associated with web pages described by stored page data and additional hierarchical structures associated with landing pages accessible via links included in received content items.

The structure comparison module 250 compares hierarchical structures associated with web pages described by stored page data and additional hierarchical structures associated with landing pages accessible via links included in received content items. In various embodiments, the structure comparison module 250 retrieves a hierarchical structure associated with each web page and policy described by stored page data and compares each of the retrieved hierarchical structures and an additional hierarchical structure associated with a landing page. For example, the online system 140 utilizes the result of a comparison of a hierarchical structure associated with a web page determined to violate a policy and an additional hierarchical structure associated with a landing page accessible via a link included in a content item to determine a likelihood the landing page also violates the policy.

In some embodiments, the structure comparison module 250 compares a hierarchical structure and an additional hierarchical structure by generating and comparing a set of characters representing at least a portion of the hierarchical structure and an additional set of characters representing a corresponding portion of the additional hierarchical structure. In some such embodiments, the set and additional set of characters representing at least a portion of a hierarchical structure and additional hierarchical structure comprise multiple subsets of characters that each represent a node of the hierarchical structure and additional hierarchical structure. For example, the structure comparison module 250 compares a subset of characters from a set of characters and an additional subset of characters from an additional set of characters to determine a difference between a node of a hierarchical structure represented by the subset of characters and a node of an additional hierarchical structure represented by the additional subset of characters. In the previous example, since a subset of characters represents a node of the hierarchical structure and an additional subset of characters represents a node of the additional hierarchical structure, a detected difference between the subset and additional subset corresponds to a difference between a node of the hierarchical structure and a node of the additional hierarchical structure.

In some embodiments, the structure comparison module 250 uses a hash function to generate a string of hexadecimal values representing a hierarchical structure and an additional string of hexadecimal values representing the additional hierarchical structure. In such embodiments, the structure comparison module 250 compares the hexadecimal values included in the string and additional string to determine a set of differences between the string and additional string. For example, since the string and additional string of hexadecimal values represents a hierarchical structure and an additional hierarchical structure, respectively, a difference between the string and additional string corresponds to a difference between the hierarchical structure and the additional hierarchical structure. Example types of hash functions that may be used by the structure comparison module 250 to generate sets of characters representing a hierarchical structure and an additional hierarchical structure and/or nodes of the hierarchical structure and additional hierarchical structure in various embodiments include SHA-1, Nilsimsa, Trend Micro Locality Sensitive Hash, SD hash, rolling hash, MD6, etc.

In some embodiments, the structure comparison module 250 compares an entire hierarchical structure and additional hierarchical structure, i.e. every node of a hierarchical structure and additional hierarchical structure. For example, the structure comparison module 250 retrieves a hierarchical structure associated with a web page and policy described by the stored page data and, using a hash function, generates a fuzzy hash representing the entire hierarchical structure. Using the same hash function, the structure comparison module 250 of the preceding example generates an additional fuzzy hash representing the additional hierarchical structure. The structure comparison module 250 compares the fuzzy hash representing the hierarchical structure and the additional fuzzy hash representing the additional hierarchical structure to determine a set of zero, one, or more differences between the hierarchical structure and additional hierarchical structure.

In other embodiments, the structure comparison module 250 compares only truncated portions of a hierarchical structure and additional hierarchical structure. Truncated portions of a hierarchical structure and additional hierarchical structure include fewer than every node of the hierarchical structure and additional hierarchical structure. Thus, comparing only truncated portions of a hierarchical structure and additional hierarchical structure allows the page structure module 245 to more quickly compare representative portions of the hierarchical structure and additional hierarchical structure in a manner that utilizes fewer computing resources than are utilized when comparing an entire hierarchical structure and additional hierarchical structure. For example, rather than generating and comparing a set and additional set of characters representing an entire hierarchical structure and additional hierarchical structure, the structure comparison module 250 generates and compares a set and additional set of characters representing truncated portions of the hierarchical structure and additional hierarchical structure. In the preceding example, the structure comparison module 250 retrieves a hierarchical structure associated with a web page and policy described by the stored page data and, using a hash function, generates a fast sketch hash representing a truncated portion of the hierarchical structure and an additional fast sketch hash representing a corresponding truncated portion of the additional hierarchical structure. The structure comparison module 250 compares the fast sketch hash and additional fast sketch hash to determine a set of zero, one or more differences between the fast sketch hash and additional fast sketch hash corresponding to a set of differences between the truncated portions of the hierarchical structure and additional hierarchical structure.

In some embodiments, the structure comparison module 250 compares truncated portions of a hierarchical structure and additional hierarchical structure before comparing larger portions of the hierarchical structure and additional hierarchical structure. For example, if fewer than a threshold number of differences between truncated portions of a hierarchical structure and additional hierarchical structure are detected, the structure comparison module 250 performs a more precise comparison of the entire hierarchical structure and additional hierarchical structure; this allows the online system 140 to conserve computing resources for performance of more complex comparisons of hierarchical structures and additional hierarchical structures having at least a minimum amount of similarity.

For each comparison of a hierarchical structure and additional hierarchical structure, the structure comparison module 250 computes a measure of dissimilarity between the hierarchical structure and additional hierarchical structure. In certain embodiments, the measure of dissimilarity between each hierarchical structure and an additional hierarchical structure is a minimum edit distance between the hierarchical structure and additional hierarchical structure. The minimum edit distance between a hierarchical structure and additional hierarchical structure describes a minimum number of edits required to make at least a compared portion of the hierarchical structure identical to a corresponding portion of the additional hierarchical structure. For example, the structure comparison module 250 computes a Levenshtein distance between a fuzzy hash representing a portion of a hierarchical structure and an additional fuzzy hash representing a corresponding portion of an additional hierarchical structure. The computed Levenshtein distance of the previous example describes a minimum number of deletions, insertions and/or substitutions required to make the fuzzy hash and additional fuzzy hash identical and, therefore, a minimum number of edits required to make the hierarchical structure and additional hierarchical structure identical.

In some embodiments, the structure comparison module 250 computes a preliminary measure of dissimilarity between truncated portions of a hierarchical structure and additional hierarchical structure and determines whether the preliminary measure of dissimilarity is below a threshold value. If the preliminary measure of dissimilarity is below the threshold value, the structure comparison module 250 computes a more precise measure of dissimilarity between larger portions of the hierarchical structure and additional hierarchical structure, in some embodiments. Computing a more precise measure of dissimilarity only if a preliminary measure of dissimilarity is below a threshold value allows the online system 140 to conserve computing resources for performance of more complex computations between hierarchical structures having at least a minimum amount of similarity to an additional hierarchical structure. As an example, the structure comparison module 250 computes a Hamming distance between a hash and additional hash representing truncated portions of a hierarchical structure and additional hierarchical structure and compares the Hamming distance to a threshold value. The computed Hamming distance describes a minimum number of substitutions required to make the hash and additional hash identical. If, in the previous example, the Hamming distance is below the threshold value, the structure comparison module 250 computes a Levenshtein distance between a larger hash representing the entire hierarchical structure and additional larger hash representing the entire additional hierarchical structure. The Levenshtein distance describes a number of deletions, insertions and/or substitutions required to make nodes and edges of the hierarchical structure and additional hierarchical structure identical. Hence, in various embodiments, the structure comparison module 250 computes a measure of dissimilarity between at least a portion of each compared hierarchical structure and additional hierarchical structure based on a determined minimum edit distance between nodes of the hierarchical structure and additional hierarchical structure. The online system 140 may use a computed measure of dissimilarity between one or more hierarchical structures and an additional hierarchical structure to determine a likelihood a landing page associated with the additional hierarchical structure violates one or more content management policies maintained by the online system 140, as described below.

The machine learning module 255 trains one or more machine learned models ("predictive models") to predict a likelihood a landing page associated with a link included in a content item received by the online system 140 violates one or more content management policies maintained by the online system 140. For example, the online system 140 receives a content item from an online system user for presentation by the online system 140 and applies a trained predictive model to one or more input features associated with a landing page accessed via a link included in the content item to determine whether the landing page violates a content management policy maintained by the online system 140. One or more corrective actions associated with the content item or online system user account associated with a user from whom the content item was received may be performed if the predictive model predicts there is at least a threshold likelihood the landing page violates a policy; conversely, the content item may be stored for possible selection for presentation by the online system 140 if the predictive mode predicts there is less than a threshold likelihood the landing page violates the policy.

In various embodiments, the machine learning module 255 trains a predictive model to predict a likelihood a landing page violates a policy based on stored information describing one or more web pages external to the online system 140 violating the policy and/or one or more web pages not violating the policy. For example, the machine learning module 255 retrieves stored page data (e.g., from the page data store 240) describing web pages external to the online system 140 determined to violate one or more policies maintained by the online system 140 and determines webpage features associated with each web page described by the page data. Additionally, or alternatively, the machine learning module 255 may identify webpage features associated with each web page determined to not violate the one or more policies based on the retrieved page data.

Webpage features identified by the machine learning module 255 describe one or more dimensions associated with each web page determined to either violate or not violate a content management policy maintained by the online system 140. Example dimensions on which webpage features may be based describe a hierarchical structure associated with a web page (e.g., a height and/or breadth of the hierarchical structure), a measure of dissimilarity between the hierarchical structure and a hierarchical structure associated with one or more additional web pages, a content publisher presenting the web page, an entity or online system user associated with the web page, and an online system policy violated or not violated by the web page. Webpage features based on each dimension associated with a web page have various values along the dimension such that a value of the webpage feature describes an attribute of the web page and/or a relationship between the web page and one or more additional web pages. For example, a webpage feature based on a measure of dissimilarity between a first hierarchical structure associated with a web page violating a particular online system policy and a second hierarchical structure associated with an additional web page violating the policy comprises a value describing a minimum edit distance between the first and second hierarchical structures. In this example, the minimum edit distance describes a minimum number of edits required to make the first and second hierarchical structures identical to each other. As another example, a webpage feature based on a description of a hierarchical structure associated with a web page includes a value describing a number of nodes comprising a breadth or height of the hierarchical structure.

To train the predictive model to predict a likelihood a landing page violates a particular policy, the machine learning module 255 determines values of the identified webpage features and identifies a sample group of web pages determined to violate the policy and/or web pages determined to not violate the policy. The online system 140 uses one or more methods of sampling to select the sample group of web pages, in various embodiments. For example, the online system 140 may use one or more sampling methods including a random sampling technique, a systematic sampling technique, a stratified sampling technique, and a cluster sampling technique. The machine learning module 255 uses the values of the webpage features associated with the sample group of web pages as training data to train the predictive model. For example, the machine learning module 255 generates weights for each webpage feature and for different combinations of webpage features described by the page data. In this example, a weight generated for a particular combination of webpage feature values describes a relationship between the combined webpage feature values based on a frequency distribution of the combination among the sample group of web pages. In various embodiments, one or more machine learning techniques may be used to train the predictive model based on a determined relationship between values of webpage features associated with the sample group of web pages. For example, the machine learning techniques may include a classification technique, a clustering technique, a decision tree learning technique, a random forest technique, a logistic regression technique, a linear regression technique, and a gradient boosting technique.

The online system 140 applies the predictive model to one or more features associated with a landing page accessed via a link included in a content item received by the online system 140 to predict a likelihood the landing page violates a policy maintained by the online system 140. In various embodiments, at least one input feature provided to the trained predictive model on which the predicted likelihood is based includes a measure of dissimilarity between a hierarchical structure associated with a web page determined to either violate or not violate the policy and an additional hierarchical structure associated with the landing page. Additional input features that may be used by the trained predictive model to predict the likelihood a landing page violates a policy include various types of data describing the policy, the additional hierarchical structure associated with the landing page, an online system user and/or third party system 130 associated with the landing page, etc. For example, the predictive model is configured to receive, as input, information about an online system user associated with the landing page, a policy maintained by the online system 140, and a value of a measure of dissimilarity between a hierarchical structure associated with a web page known to violate the policy and an additional hierarchical structure associated with the landing page.

In some embodiments, based on the provided input feature(s), the trained predictive model outputs a ratio describing a probability a landing page violates a policy based on determined strengths of associations among multiple measures of dissimilarity used by the machine learning module 255 to train the model and an input measure of dissimilarity between an additional hierarchical structure associated with the landing page and a hierarchical structure described by stored page data. For example, the online system 140 receives the output information and determines a likelihood a landing page violates a policy based on the received information. Utilizing a predictive model to predict a likelihood a landing page violates a policy maintained by the online system 140 is described in more detail below in conjunction with FIG. 9.

The web server 260 links the online system 140 via the network 120 to the one or more client devices 110, as well as to the one or more third party systems 130. The web server 260 serves web pages, as well as other content, such as JAVA®, FLASH®, XML and so forth. The web server 260 may receive and route messages between the online system 140 and the client device 110; for example, the messages are instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Figure 3A:
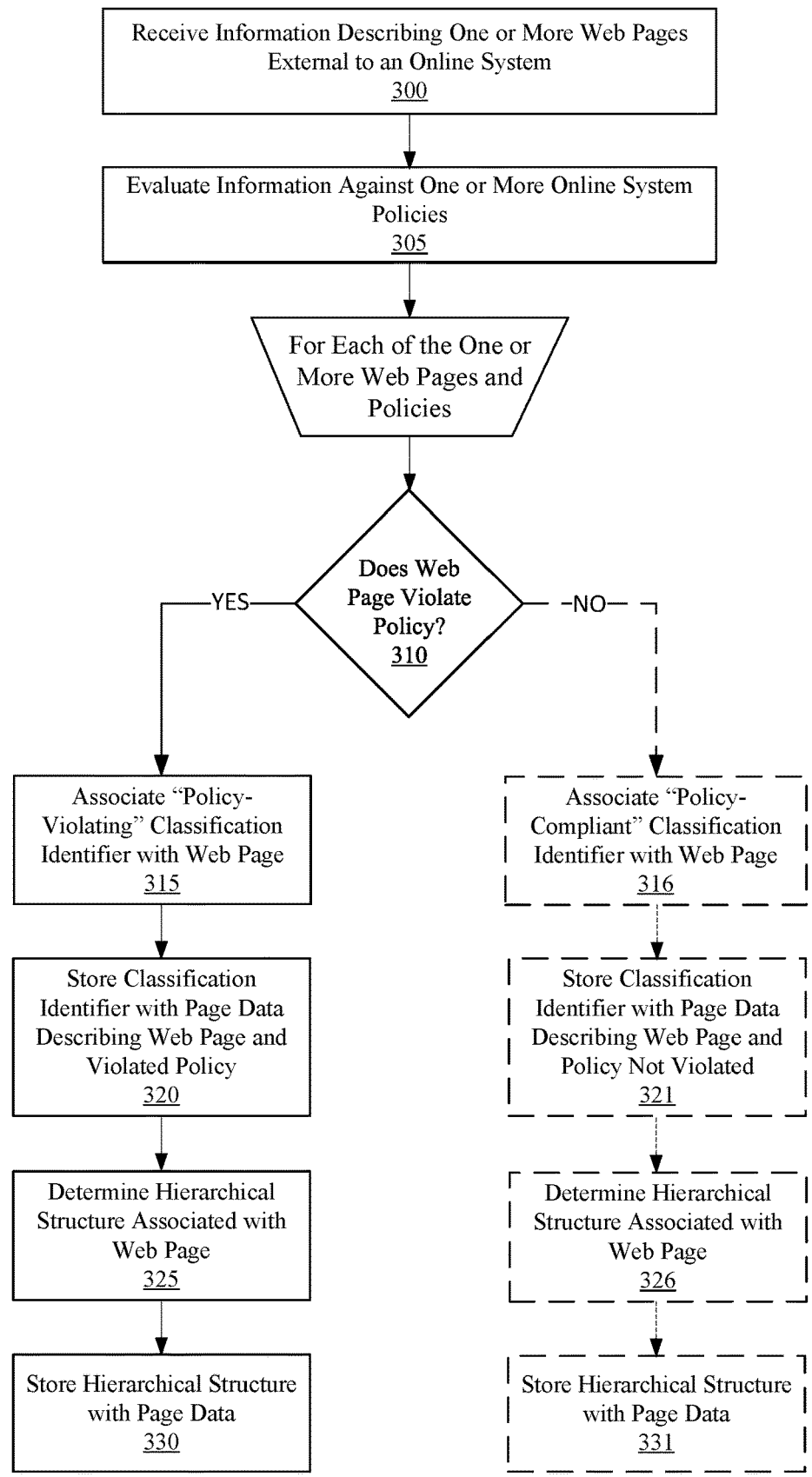
FIGS. 3A and 3B are flow charts illustrating a method for determining a likelihood a landing page violates an online system policy based on a structural similarity between the landing page and a web page violating the policy, in accordance with an embodiment.
Figure 3B:
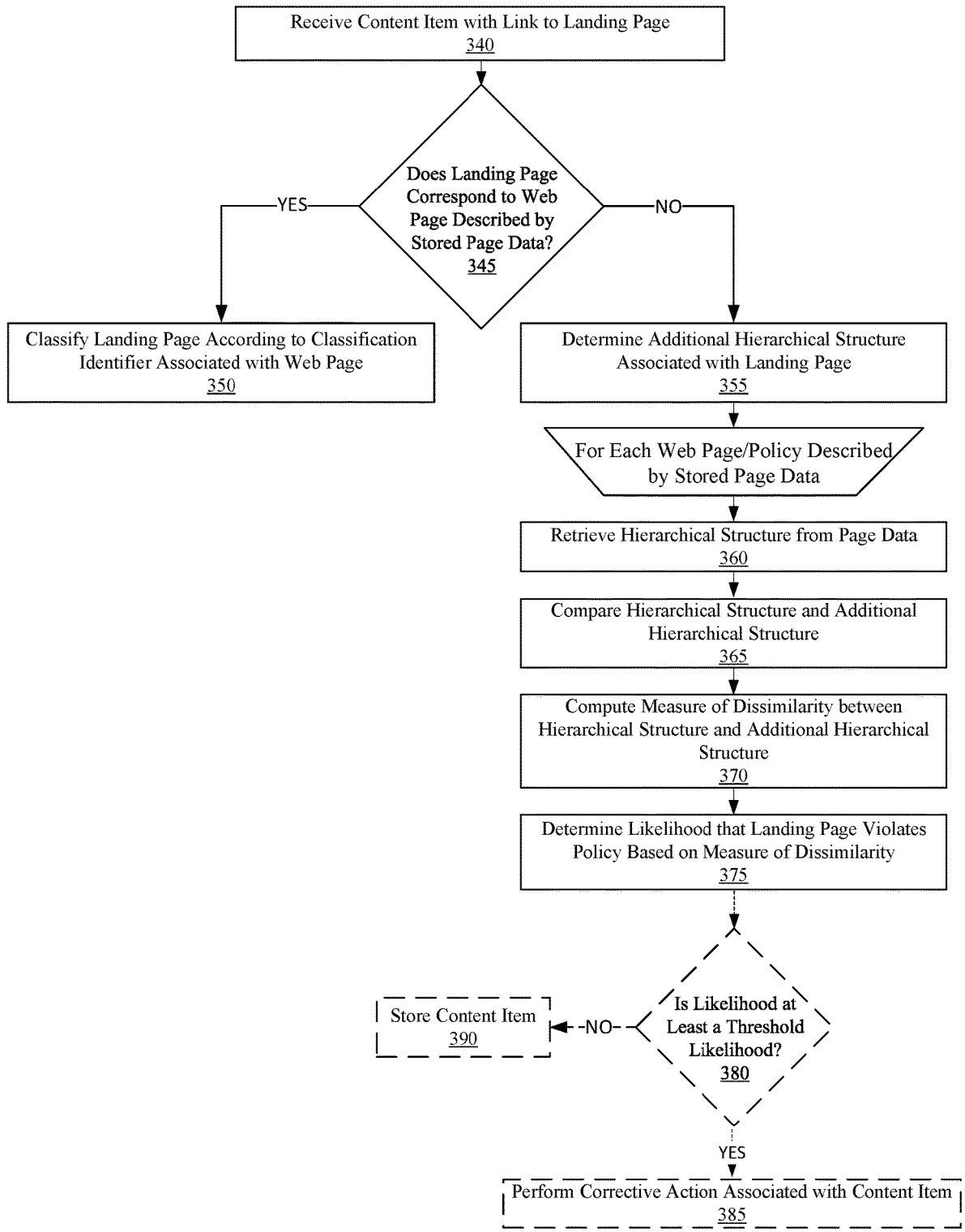

Determining a Likelihood a Landing Page Violates an Online System Policy Based on a Structural Similarity Between the Landing Page and a Web Page Violating the Policy FIGS. 3A and 3B are flow charts illustrating a method for determining a likelihood a landing page violates an online system policy based on a structural similarity between the landing page and a web page violating the policy. In other embodiments, the method may include different and/or additional steps than those shown in FIGS. 3A and 3B. Additionally, steps of the method may be performed in different orders than the order described in conjunction with FIGS. 3A and 3B in various embodiments.

Referring to FIG. 3A, the online system 140 receives 300 information describing one or more web pages external to the online system 140 and evaluates 305 the information against one or more content management policies maintained by the online system 140. Example types of information received 300 by the online system 140 describing the one or more web pages include a network address (e.g., a URL) of a web page, a markup language document associated with the web page, a third party system 130 associated with the web page, and a description of text data, audio, video, and images presented by the web page. For example, the online system 140 accesses a web page presented by a third-party system 130 and determines information describing the web page, such as a URL of the web page, types of content presented by the web page, a subject matter of the content, and an online system user associated with the web page.

In some embodiments, the information describing the one or more web pages is received 300 from an entity that publishes or is otherwise associated with the web pages, while in other embodiments the information is received 300 from a third party system 130 that compiles information describing various web pages published by various content publishers and provides the information to the online system 140. In one embodiment, information describing a web page external to the online system 140 may be communicated to the online system 140 by a client device 110 or an application executing on the client device 110 when a user of the client device 110 accesses the web page via the client device 110. For example, the online system 140 receives 300 information describing a network address of a web page and content presented by the web page via an application associated with the online system 140 executing on a client device 110 if a user of the client device 110 logs into the online system 140 via the application and uses the client device 110 to visit the web page while logged into the online system 140.

In various embodiments, the online system 140 accesses multiple web pages external to the online system 140 and, for each web page, determines 310 whether the web page or text, images, videos or any other content included in the web page violates each policy of a set of content management policies maintained by the online system 140. Policies that may be violated by a web page or content included in the web page include various content management policies prohibiting or restricting presentation of certain types of content and/or subject matter by the online system 140. For example, certain content management policies restrict presentation of content relating to adult activities, such as gambling and alcohol use. As another example, certain content management policies prohibit presentation of sexually suggestive content and advertisements that promote illegal products or services. Additional content management policies that may be violated by a web page or content included in the web page include policies that restrict or prohibit presentation of subject matter involving, for example, bullying, criminal activity, hate speech, malware, nudity, regulated goods, spam, threats, and any other subject matter that may be deemed by the online system 140 unsuitable for presentation to users of the online system 140.

In various embodiments, the online system 140 associates 315, 316 a classification identifier with each web page described by the received information based on the determination of whether the web page violates a policy against which the web page was evaluated 305. For example, a "policy-violating" classification identifier associated 315 with a web page identifies the web page to the online system 140 as a web page determined 310 to violate an online system policy. As another example, a "policy-compliant" classification identifier associated 316 with a web page identifies the web page to the online system 140 as a web page determined 310 to not violate an online system policy. Associating 315, 316 a classification identifier with a web page allows the online system 140 to index information describing the web page by the result of the determination of whether the web page violates a particular policy. For example, the online system 140 uses the "policy-violating" classification identifier to retrieve stored information describing a set of web pages determined 310 to violate one or more online system policies against which the web pages were evaluated 305.

In some embodiments, each policy maintained by the online system 140 is associated 315, 316 with a set of policy-specific classification identifiers, such that each web page described by the received information may be associated 315, 316 with multiple classification identifiers based on a determination of whether the web page violates each of multiple online system policies. For example, a "policy-violating" classification identifier associated 315 with a first policy identifies a web page with which the classification identifier is associated 315 as a web page violating the first policy, a "policy-violating" classification identifier associated 315 with a second policy identifies a web page with which the classification identifier is associated 315 as a web page violating the second policy, etc. As another example, a web page associated 315 with a "policy-violating" classification identifier associated with a first policy and a "policy-compliant" classification identifier associated 316 with a second policy identifies the web page as a web page violating the first policy and not violating the second policy.

If the online system 140 determines 310 a web page or a component of the web page violates an online system policy, the online system 140 associates 315 a "policy-violating" classification identifier with the web page and stores 320 the classification identifier along with page data describing the web page and the policy violated by the web page, in various embodiments. In some embodiments, page data stored 320 by the online system 140 includes the received information describing the web page and additional information determined by the online system 140 describing the web page and one or more policies violated by the web page. For example, page data for a particular web page is stored 320 in the page data store 240 with one or more classification identifiers associated 315, 316 with the web page and includes a network address (e.g., a URL) of the web page, a description of one or more components of the web page violating one or more policies, and a description of the one or more policies violated by the web page or a component of the web page.

Alternatively, or in addition, if the online system 140 determines 310 a web page does not violate a particular policy, the online system 140 associates 316 a "policy-compliant" classification identifier with the web page and stores 321 the classification identifier along with page data describing the web page and the policy not violated by the web page, in some embodiments. For example, information stored 321 in the page data store 240 for a web page determined 310 to not violate a content management policy includes a policy-compliant classification identifier, a network address (e.g., a URL) of the web page, a description of one or more components of the web page that do not violate the policy, and a description of the policy. Hence, the online system 140 receives 300 and stores 320 information describing web pages external to the online system 140 that violate one or more policies of the online system 140 and, in some embodiments, receives 300 and 321 stores information describing web pages that do not violate the one or more policies.

In various embodiments, if the online system 140 determines 310 a web page violates a policy, the online system 140 determines 325 a hierarchical structure associated with the web page and stores 330 information describing the hierarchical structure along with page data describing the web page and violated policy. The hierarchical structure determined 325 by the online system 140 and associated with a web page represents a structural composition of at least a portion of the web page. For example, a hierarchical structure is a schematic representation of a markup language document corresponding to a web page that illustrates various elements of the markup language document and relationships between the elements. In some embodiments, the online system 140 determines 325 a hierarchical structure representing a structural composition of an entire web page while in other embodiments, only a portion of the structural composition of the web page is represented by the hierarchical structure.

Figure 4:
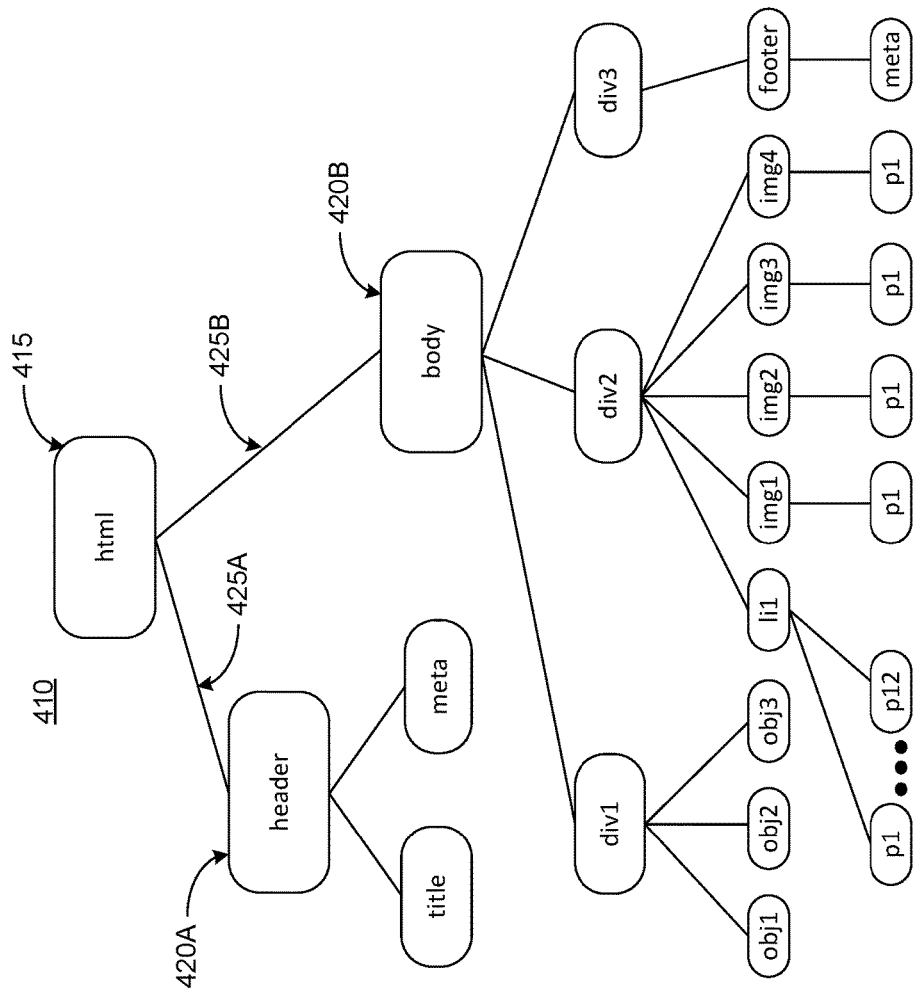
FIG. 4 is an example web page determined to violate an online system policy and a hierarchical structure associated with the web page, in accordance with an embodiment.
Figure 4:
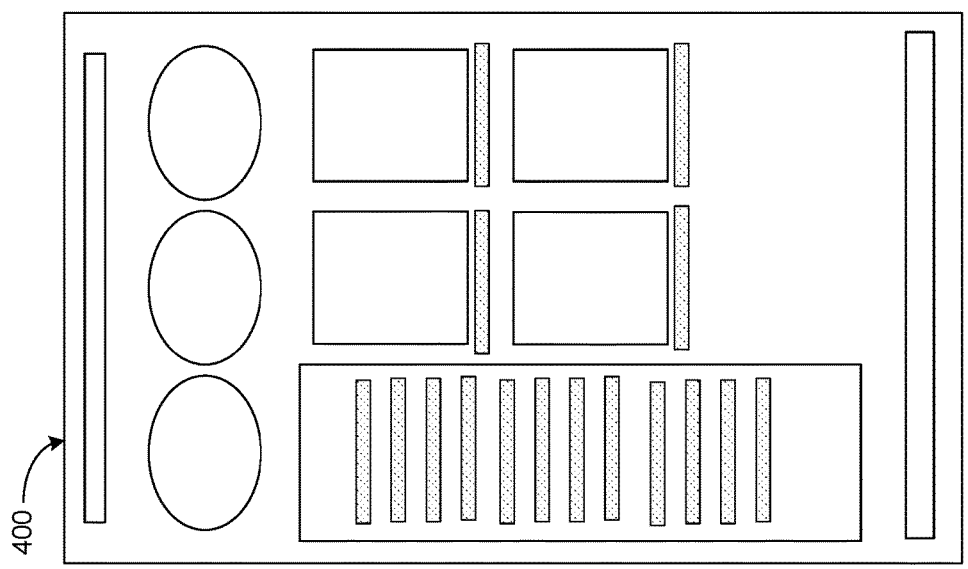

For example, referring to FIG. 4, the hierarchical structure determined 325 by the online system 140 is a Document Object Model (DOM) tree 410 having a plurality of nodes representing elements of a markup language document comprising the web page 400 as presented by a web browser executing on a client device 110. As illustrated in this example, certain nodes of the hierarchical structure are connected by edges representing relationships between the nodes such that a root node 415 of the hierarchical structure is connected to other nodes 420A, 420B of the hierarchical structure via branch-like paths of nodes 420A, 420B and edges 425A, 425B, in certain embodiments. In some embodiments, some nodes of the hierarchical structure correspond to elements that are displayed in a web page (e.g., URL links, buttons, images, text, columns, etc.) by a web browser executing on a client device 110, while other nodes may correspond to elements that are not visually represented in the web page (e.g., audio, metadata, tracking pixels, etc.). Additionally, the hierarchical structure has a height and breadth that are dependent on the number of nodes, edges and relationships between the nodes and edges of the hierarchical structure. For example, the hierarchical structure illustrated in FIG. 4 has a height of five nodes and a breadth of 17 nodes.

In some embodiments, the online system 140 may also determine 326 a hierarchical structure for each web page determined to not violate one or more policies and store 331 information describing the hierarchical structure along with page data describing the web page and one or more policies not violated by the web page. For example, if the online system 140 maintains multiple content management policies and receives 300 information describing multiple web pages determined 310 to violate some policies and not violate other policies, the online system 140 determines 325, 326 and stores 330, 331, for each policy, a hierarchical structure associated with each web page violating the policy and each web page not violating the policy. Hence, the online system 140 determines 325, 326 a hierarchical structure associated with each web page determined 310 to violate and, in some embodiments, not violate a content management policy maintained by the online system 140 and stores 330, 331 information describing the hierarchical structure with page data describing the associated web page and one or more policies violated and/or not violated by the web page.

Turning to FIG. 3B, the online system 140 receives 340 a content item from an online system user for presentation by the online system 140 and identifies a link included in the content item to a landing page external to the online system 140. For example, the online system 140 receives 340 the content item from a user of the online system 140 for presentation to additional online system users meeting certain targeting criteria associated with the content item. In some embodiments, the content item is a sponsored content item for which the online system 140 receives compensation in exchange for presenting to a user, while in other embodiments the content item is an organic content item for which the online system 140 does not receive compensation in exchange for presenting to the user. Example types of content items that may be received 340 by the online system 140 and that may include a link to a landing page external to the online system 140 include location check-ins, posts, status updates, images, audio, videos, articles, advertisements, and any other suitable content a user of the online system 140 may wish to share with an additional user of the online system 140. For example, the content item is an advertisement including a link to a landing page external to the online system 140 that presents content describing products or services associated with an online system user who provided the content item to the online system 140 for presentation.

In various embodiments, the online system 140 identifies the landing page associated with the link included in the received 340 content item and retrieves stored page data to determine 345 whether the landing page corresponds to a web page described by information included in the stored page data. For example, the online system 140 identifies a network address (e.g., a URL) of the landing page and determines 345 whether the network address corresponds to a network address described by information included in the stored page data. If the online system 140 determines 345 the landing page corresponds to a web page described by information included in stored page data, the online system 140 classifies 350 the landing page according to the classification identifier associated with the web page. For example, if the online system 140 determines 345 the landing page corresponds to a web page associated with a "policy-violating" classification identifier, the online system 140 determines the landing page violates a policy violated by the web page. In the previous example, the online system 140 may identify the policy violated by the landing page based on a description of the policy included in the page data associated with the web page and/or the policy associated with the classification identifier. As another example, if the online system 140 determines 345 the landing page corresponds to a web page associated with a "policy-violating" classification identifier associated with a first policy and a "policy-compliant" identifier associated with a second policy, the online system 140 determines the landing page violates the first policy and does not violate the second policy.

If the landing page is determined 345 to violate a policy based on a "policy-violating" classification identifier associated with a corresponding web page described by stored page data, the online system 140 may perform one or more corrective actions associated with the content item and/or an online system user account associated with an online system user from whom the content item was received, as further described below. For example, the online system 140 disallows presentation of a content item including a link to the landing page unless the content item is modified to no longer violate the policy. Conversely, if the landing page is determined 345 to not violate a policy based on a "policy-compliant" classification identifier associated with a corresponding web page described by stored page data, the online system 140 may store the content item including the link to the landing page for later retrieval. For example, the online system 140 stores the content item for possible presentation to online system users meeting certain targeting criteria describing users eligible to receive the content item.

If the online system 140 determines 345 the landing page does not correspond to a web page described by stored page data, the online system 140 determines 355 an additional hierarchical structure associated with the landing page. In various embodiments, the additional hierarchical structure represents a structural composition of at least a portion of the landing page corresponding to the portion of the web page represented by each hierarchical structure determined 325, 326 by the online system 140 for each policy-violating and/or policy-compliant web page. The additional hierarchical structure represents various elements of the landing page and relationships between the elements. Additionally, a type of representation of the additional hierarchical structure corresponds to the type of representation of each hierarchical structure determined 325, 326 by the online system 140. Thus, if the hierarchical structure associated with each policy-violating and/or policy-compliant web page determined 325, 326 by the online system 140 is a DOM tree, the additional hierarchical structure determined 355 by the online system 140 is also a DOM tree.

Figure 5:
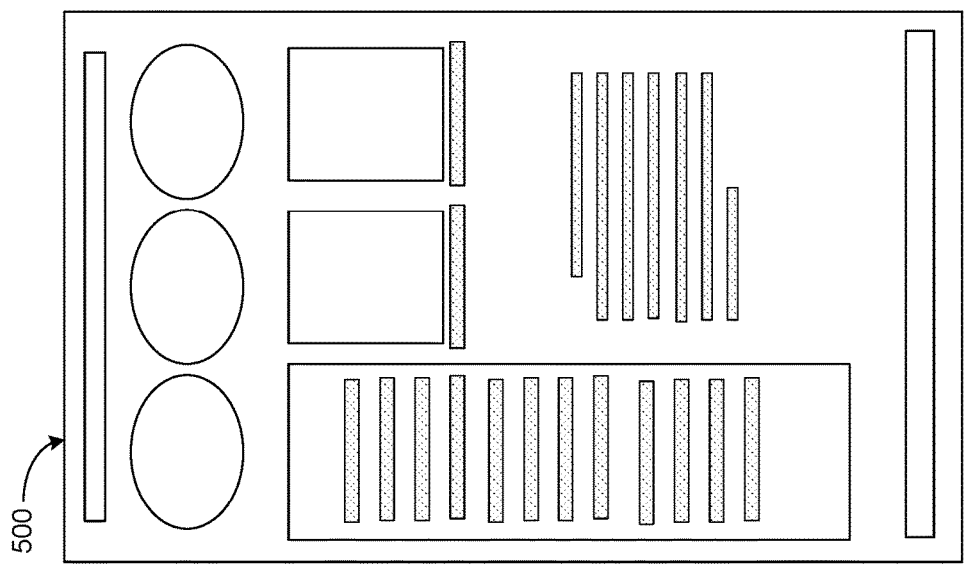
FIG. 5 is an example landing page associated with a link included in a content item received by the online system and an additional hierarchical structure associated with the landing page, in accordance with an embodiment.
Figure 5:
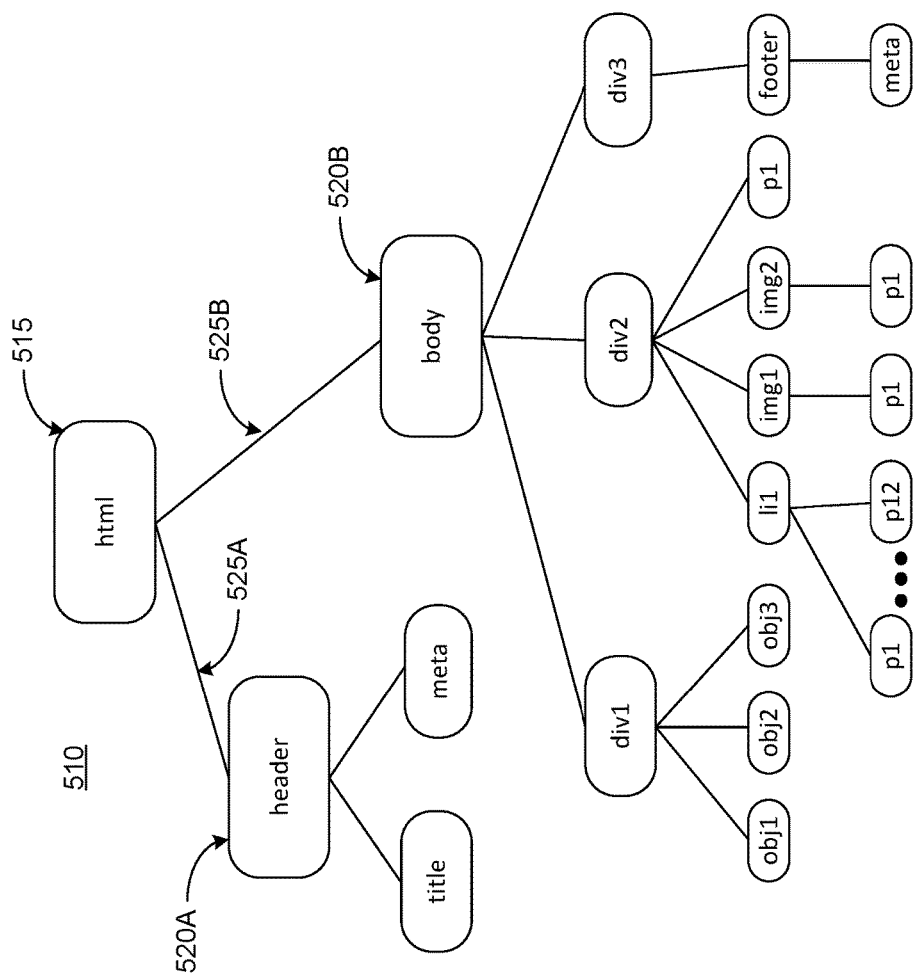

In the example of FIG. 5, the additional hierarchical structure determined 355 by the online system 140 is a DOM tree 510 having a plurality of nodes representing elements of a markup language document presented as the landing page 500 by a web browser executing on a client device 110. As with each hierarchical structure, various nodes of the additional hierarchical structure are connected by edges representing relationships between the nodes such that a root node 515 of the additional hierarchical structure is connected to other nodes 520A, 520B via branch-like paths of nodes 520A, 520B and edges 525A, 525B. In some embodiments, some nodes of the additional hierarchical structure correspond to elements that are displayed in the landing page (e.g., URL links, buttons, images, text, columns, etc.) by a web browser executing on a client device 110, while other nodes may correspond to elements that are not visually represented in the landing page (e.g., audio, metadata, tracking pixels, etc.). Further, the additional hierarchical structure has a height and breadth that are dependent on the number of nodes, edges and relationships between the nodes and edges of the additional hierarchical structure. For example, the additional hierarchical structure illustrated in FIG. 5 has a height of five nodes and a breadth of 15 nodes.

In various embodiments, the online system 140 retrieves 360 the hierarchical structure associated with each web page and policy described by the stored page data and compares 365 each of the retrieved 360 hierarchical structures and the additional hierarchical structure. In some embodiments, the online system 140 compares 365 a hierarchical structure and the additional hierarchical structure by generating and comparing 365 a set of characters representing at least a portion of the hierarchical structure and an additional set of characters representing a corresponding portion of the additional hierarchical structure. In some such embodiments, the set and additional set of characters representing at least a portion of a hierarchical structure and the additional hierarchical structure comprise multiple subsets of characters that each represent a node of the hierarchical structure and additional hierarchical structure. For example, the online system 140 compares 365 a subset of characters from the set of characters and an additional subset of characters from the additional set of characters to determine a difference between a node of a hierarchical structure represented by the subset of characters and a node of the additional hierarchical structure represented by the additional subset of characters. In the previous example, since a subset of characters represents a node of the hierarchical structure and an additional subset of characters represents a node of the additional hierarchical structure, a detected difference between the subset and additional subset corresponds to a difference between a node of the hierarchical structure and a node of the additional hierarchical structure.

In another example, using a hash function, the online system 140 generates a string of hexadecimal values representing a hierarchical structure and an additional string of hexadecimal values representing the additional hierarchical structure; the online system 140 compares 365 the hexadecimal values included in the string and additional string to determine a set of differences between the compared values. In the previous example, since the string of hexadecimal values represents a hierarchical structure and the additional string of hexadecimal values represents the additional hierarchical structure, a difference between the hexadecimal values corresponds to a difference between the hierarchical structure and additional hierarchical structure. Example types of hash functions that may be used to generate sets of characters representing a hierarchical structure and the additional hierarchical structure and/or nodes of the hierarchical structure and additional hierarchical structure include SHA-1, Nilsimsa, Trend Micro Locality Sensitive Hash, SD hash, rolling hash, MD6, etc.

Figure 6:
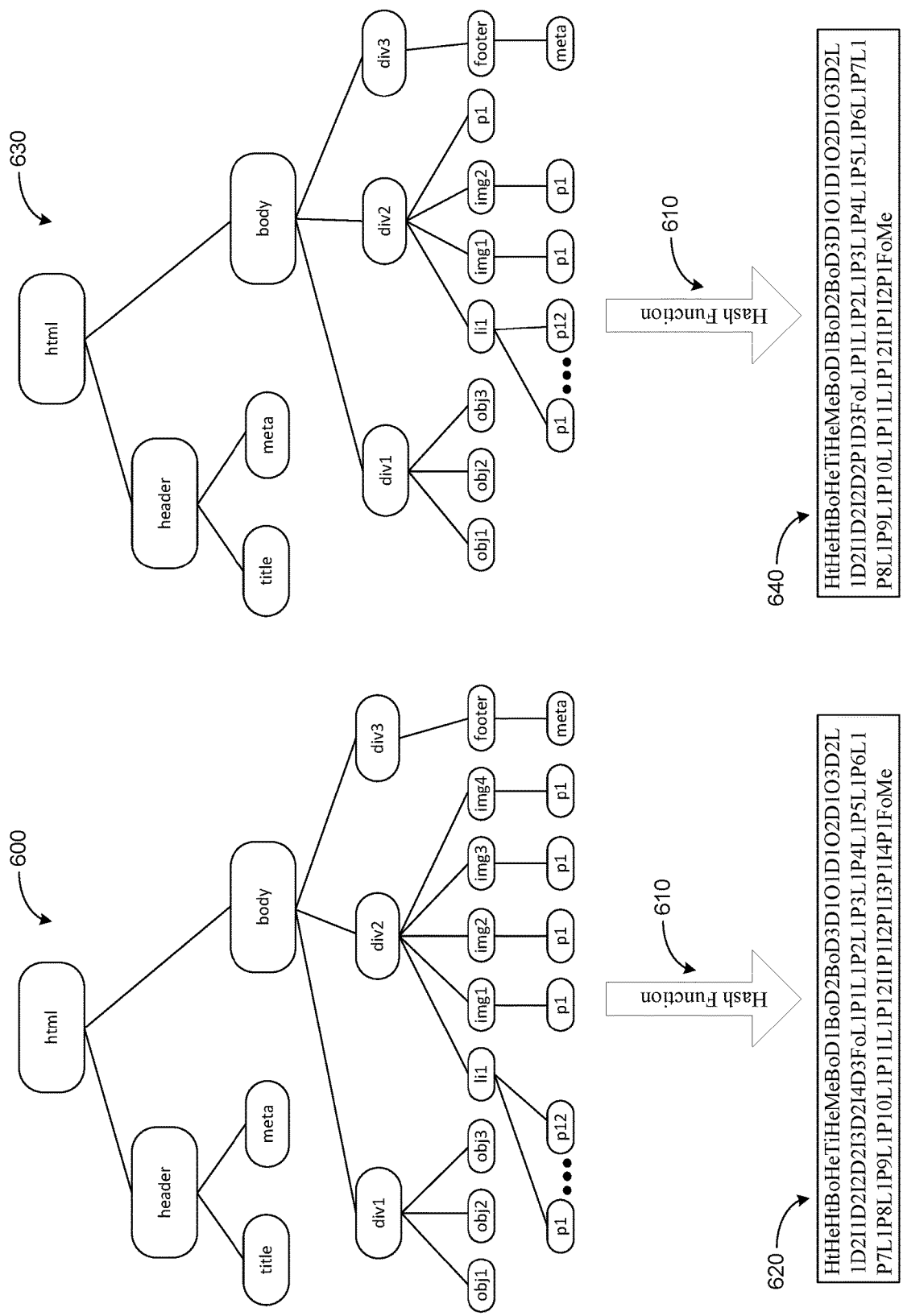
FIG. 6 illustrates an example set of characters generated by an online system representing a hierarchical structure associated with a web page and an additional set of characters generated by the online system representing an additional hierarchical structure associated with a landing page, in accordance with an embodiment.

In some embodiments, the online system 140 compares 365 an entire hierarchical structure and the additional hierarchical structure, i.e. every node of a hierarchical structure and the additional hierarchical structure. For example, referring to FIG. 6, the online system 140 retrieves 360 a hierarchical structure 600 associated with a web page and policy described by the stored page data and, using a hash function 610, generates a string of characters 620 (e.g., a fuzzy hash) representing the hierarchical structure 600. Using the same hash function 610, the online system 140 generates an additional string of characters 640 (e.g., an additional fuzzy hash) representing the additional hierarchical structure 630. In this example, the online system 140 compares 365 the string of characters 620 representing the hierarchical structure 600 and the additional string of characters 640 representing the additional hierarchical structure 630 to determine a set of zero, one, or more differences between the hierarchical structure 600 and additional hierarchical structure 630.

Figure 7:
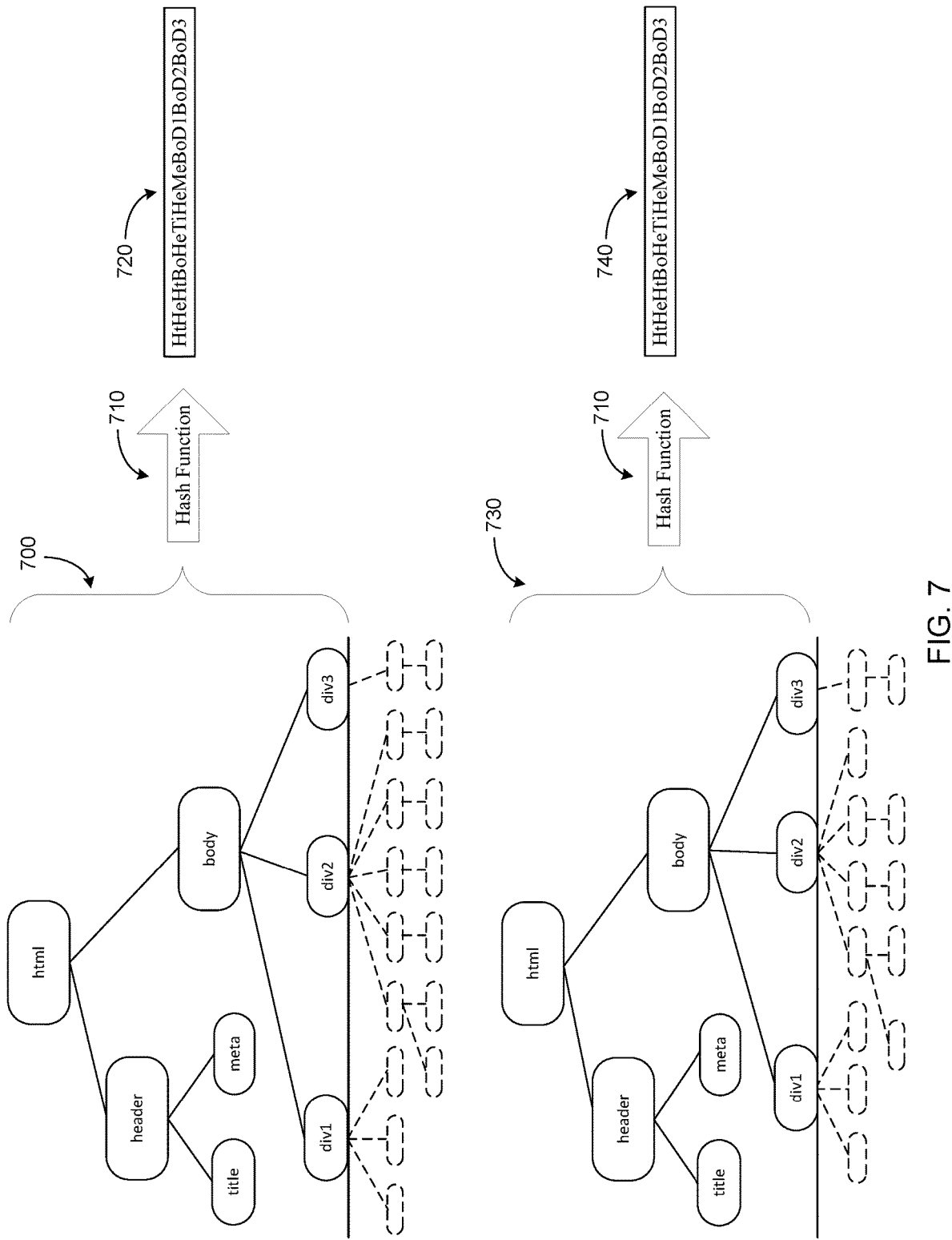
FIG. 7 illustrates an example set of characters generated by an online system representing a truncated portion of a hierarchical structure associated with a web page and an additional set of characters generated by the online system representing a truncated portion of an additional hierarchical structure associated with a landing page, in accordance with an embodiment.

In other embodiments, the online system 140 compares 365 only truncated portions of the hierarchical structure and the additional hierarchical structure, allowing the online system 140 to more quickly compare 365 representative portions of the hierarchical structure and additional hierarchical structure in a manner that utilizes fewer computing resources than are utilized when comparing 365 an entire hierarchical structure and additional hierarchical structure. In such embodiments, the truncated portions of the hierarchical structure and additional hierarchical structure include fewer than every node of the hierarchical structure and additional hierarchical structure. For example, referring to FIG. 7, rather than generating and comparing 365 a set and additional set of characters representing an entire hierarchical structure and additional hierarchical structure, the online system 140 generates and compares 365 a set and additional set of characters representing truncated portions 700, 730 of the hierarchical structure and additional hierarchical structure. In this example, the online system 140 retrieves 360 a hierarchical structure associated with a web page and policy described by the stored page data and, using a hash function 710, generates a string of characters 720 representing a truncated portion 700 of the hierarchical structure and an additional string of characters 740 representing a corresponding truncated portion 730 of the additional hierarchical structure. The online system 140 compares 365 the string and additional string of characters 720, 740 to determine a set of zero, one or more differences between the string and additional string of characters 720, 740 corresponding to a set of differences between the truncated portions 700, 730 of the hierarchical structure and additional hierarchical structure.

In some embodiments, the online system 140 compares 365 truncated portions 700, 730 of the hierarchical structure and additional hierarchical structure and then compares 365 larger portions of the hierarchical structure and additional hierarchical structure if fewer than a threshold number of differences between the truncated portions 700, 730 are detected. For example, preliminary comparison of truncated portions 700, 730 of a hierarchical structure and the additional hierarchical structure allows the online system 140 to determine whether allocation of additional computing resources to performance of a more complex comparison of larger portions of the hierarchical structure and additional hierarchical structure is warranted. If the online system 140 detects fewer than a threshold number of differences between truncated portions 700, 730 of the hierarchical structure and the additional hierarchical structure, a more complete and precise comparison of the entire hierarchical structure and additional hierarchical structure may be performed, in some embodiments. This allows the online system 140 to conserve computing resources for performance of more complex comparisons of hierarchical structures having at least a minimum amount of similarity.

For each comparison of a hierarchical structure and the additional hierarchical structure, the online system 140 computes 370 a measure of dissimilarity between the hierarchical structure and additional hierarchical structure. In various embodiments, the measure of dissimilarity is a minimum edit distance between the hierarchical structure and additional hierarchical structure describing a minimum number of edits required to make at least the compared 365 portion of the hierarchical structure identical to the corresponding portion of the additional hierarchical structure. For example, the measure of dissimilarity between a hierarchical structure and the additional hierarchical structure is a Hamming distance between a fuzzy hash representing one or more nodes and edges of the hierarchical structure and an additional fuzzy hash representing one or more nodes and edges of the additional hierarchical structure. In the previous example, the computed 370 Hamming distance describes a minimum number of substitutions required to make the fuzzy hash and additional fuzzy hash identical and, therefore, a minimum number of edits required to make the compared 365 nodes and edges of the hierarchical structure and additional hierarchical structure identical. Hence, in various embodiments, the online system 140 computes 370 a measure of dissimilarity between at least a portion of each hierarchical structure and corresponding portion of the additional hierarchical structure based on a determined minimum edit distance between nodes and/or edges of the hierarchical structure and the additional hierarchical structure.

Figure 8:
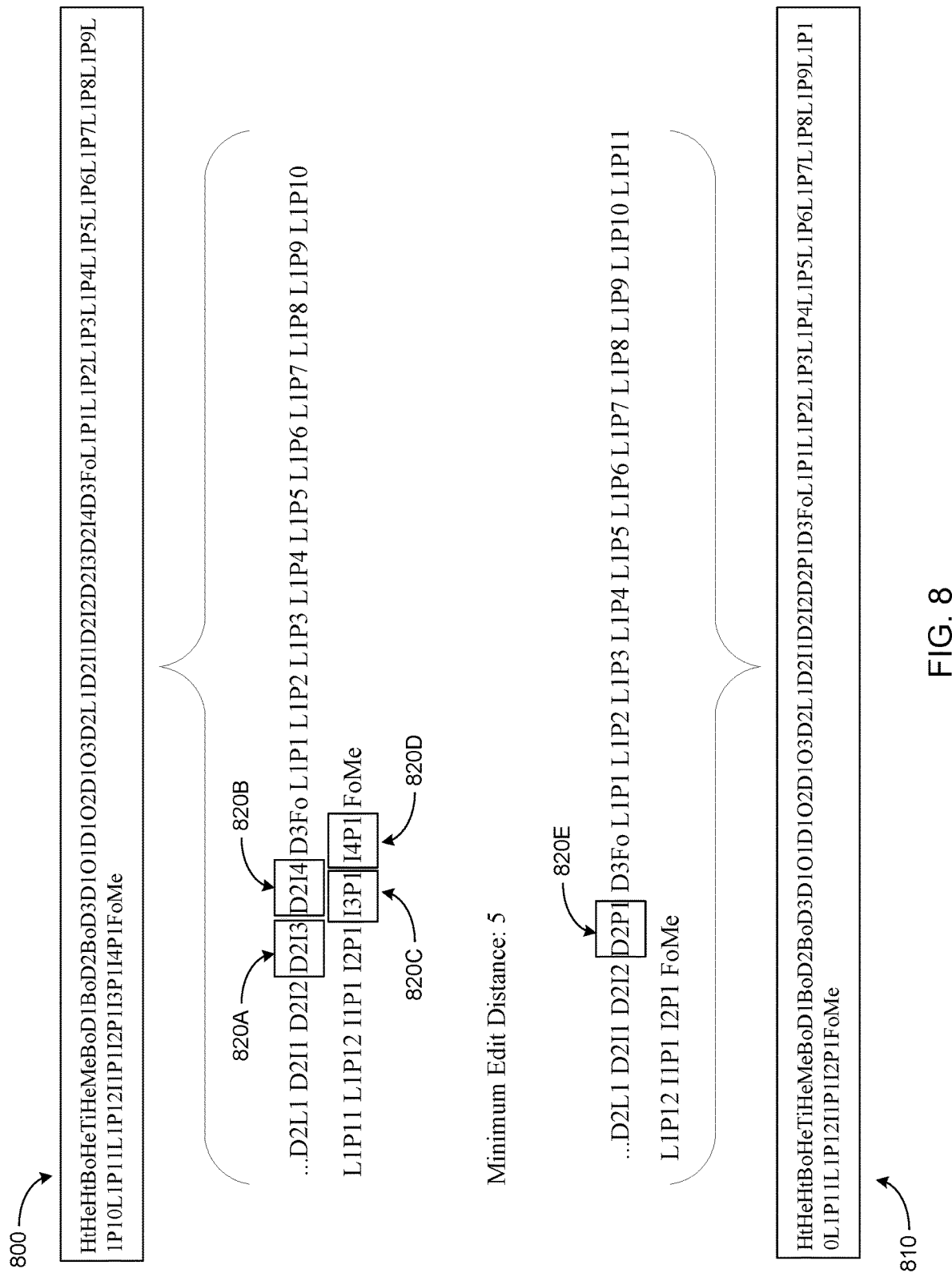
FIG. 8 illustrates an example measure of dissimilarity between a hierarchical structure associated with a web page and an additional hierarchical structure associated with a landing page, in accordance with an embodiment.

For example, as illustrated in FIG. 8, if the online system 140 generates and compares 365 a set of characters 800 (e.g., a fast sketch hash) representing a hierarchical structure and an additional set of characters 810 (e.g., an additional fast sketch hash) representing the additional hierarchical structure, the online system 140 computes 370 a Levenshtein distance between the set and additional set of characters 800, 810. The computed 370 Levenshtein distance describes a minimum number of deletions, insertions and/or substitutions required to make the set and additional set of characters 800, 810 identical, and therefore a minimum number of edits required to make the hierarchical structure and additional hierarchical structure identical. Based on the minimum number of edits required to make the hierarchical structure and additional hierarchical structure identical, the online system 140 computes 370 a measure of dissimilarity between the hierarchical structure and additional hierarchical structure. In FIG. 8, the online system 140 determines a minimum number of five edits is required to make the hierarchical structure and additional hierarchical structure identical. For example, to make the set of characters 800 identical to the additional set of characters 810, four subsets of characters 820A-D included in the set of characters 800 must be inserted into the additional set of characters 810 and one subset of characters 820E included in the additional set of characters 810 must be deleted. Hence, the online system 140 computes 370 a measure of dissimilarity between the hierarchical structure and the additional hierarchical structure that is equal to five, in this example.

In some embodiments, the online system 140 computes 370 a measure of dissimilarity between truncated portions of a hierarchical structure and the additional hierarchical structure to determine whether the measure of dissimilarity is below a threshold value; if the measure of dissimilarity is below the threshold value, the online system 140 computes 370 a more precise measure of dissimilarity between larger portions of the hierarchical structure and additional hierarchical structure. This allows the online system 140 to conserve computing resources for determining more precise differences between the additional hierarchical structure and hierarchical structures having at least a minimum amount of similarity to the additional hierarchical structure. For example, the online system 140 computes 370 a Hamming distance between sets of characters representing truncated portions of a hierarchical structure and the additional hierarchical structure and compares the Hamming distance to a threshold value. The computed 370 Hamming distance describes a minimum number of substitutions required to make the sets of characters identical, corresponding to a minimum number of edits required to make the hierarchical structure and additional hierarchical structure identical. If, in the previous example, the Hamming distance is below the threshold value, the online system 140 computes 370 a Levenshtein distance between larger sets of characters representing the entire hierarchical structure and additional hierarchical structure. The more complex and precisely computed 370 Levenshtein distance of the previous example describes a minimum number of deletions, insertions and/or substitutions required to make nodes and edges of the hierarchical structure and additional hierarchical structure identical.

Based on the computed 370 measure of dissimilarity between one or more hierarchical structures and the additional hierarchical structure, the online system 140 determines 375 a likelihood the landing page violates one or more policies violated by each web page associated with the one or more hierarchical structures. The likelihood the landing page violates the one or more policies is inversely proportional to the measure of dissimilarity between the additional hierarchical structure and one or more hierarchical structures, in various embodiments. For example, if the computed 370 measure of dissimilarity is a minimum edit distance between a hierarchical structure associated with a web page violating a policy and the additional hierarchical structure, the online system 140 determines 375 there is a greater likelihood the landing page violates the policy if the measure of dissimilarity is 15 than if the measure of dissimilarity is 75.

In some embodiments, the online system 140 compares the computed 370 measure of dissimilarity between a hierarchical structure and the additional hierarchical structure to a threshold measure of dissimilarity. In such embodiments, the online system 140 determines 375 a likelihood the landing page violates a policy either violated or not violated by the web page associated with the hierarchical structure based on the comparison. For example, if the web page associated with the hierarchical structure is a web page violating an anti-malware policy, the online system 140 determines 375 it is likely the landing page violates the anti-malware policy if the computed 370 measure of dissimilarity between the hierarchical structure and the additional hierarchical structure is below a threshold measure of dissimilarity. Continuing the previous example, the online system 140 determines 375 it is not likely the landing page violates the policy if the computed 370 measure of dissimilarity is at least the threshold measure of dissimilarity. Hence, the online system 140 determines 375 a likelihood the landing page violates a policy either violated or not violated by a web page associated with a hierarchical structure based on a determination of whether the computed 370 measure of dissimilarity between the hierarchical structure and the additional hierarchical structure is below or at least a threshold value, in some embodiments.

In various embodiments, the online system 140 determines 375 a likelihood the landing page violates a policy based on an analysis of multiple computed 370 measures of dissimilarity between the additional hierarchical structure and hierarchical structures associated with multiple web pages violating the policy and/or multiple web pages not violating the policy. For example, the online system 140 retrieves page data describing every web page associated with a hierarchical structure sharing below a threshold measure of dissimilarity with the additional hierarchical structure and determines 375 a likelihood the landing page violates a policy either violated or not violated by each web page based on the classification identifier associated with a majority of the web pages. Thus, if a majority of web pages described by the retrieved page data in the preceding example are associated with a "policy-violating" classification identifier, the online system 140 determines 375 there is at least a threshold likelihood the landing page violates the policy. Conversely, if the majority of web pages described by the retrieved page data are associated with a "policy-compliant" classification identifier, the online system 140 determines 375 there is at least a threshold likelihood the landing page does not violate the policy.

In one embodiment, the online system 140 retrieves page data describing a specified number of web pages associated with hierarchical structures having a smallest measure of dissimilarity in common with the additional hierarchical structure and determines 375 a likelihood the landing page violates a policy based on the classification identifier associated with a majority of web pages described by the retrieved page data. For example, using a K nearest neighbors algorithm where K has a value of five, the online system 140 identifies five hierarchical structures described by stored page data having the smallest computed 370 measures of dissimilarity in common with the additional hierarchical structure. In the preceding example, the online system 140 determines 375 a likelihood the landing page violates a policy based on the classification identifier associated with the majority of web pages represented by the five hierarchical structures. Thus, if three of the five hierarchical structures of the previous example represent web pages associated with a "policy-violating" classification identifier associated with an anti-spam policy, the online system 140 determines 375 there is a high likelihood the landing page violates the anti-spam policy.

In other embodiments, the online system 140 uses multiple computed 370 measures of dissimilarity between hierarchical structures associated with web pages violating a policy and/or web pages not violating the policy as training data to train a machine-learned predictive model to output a likelihood the landing page violates the policy. For example, the online system 140 uses one or more machine learning techniques to determine associations and strengths of associations among measures of dissimilarity between hierarchical structures associated with web pages violating a policy and hierarchical structures associated with web pages not violating the policy. One or more additional features associated with the web pages may also be used to train the predictive model. For example, additional features may include a height or breadth of the hierarchical structure associated with a web page, a content publisher presenting the web page, an online system user associated with the web page, an online system policy violated or not violated by the web page, etc. Example types of machine learning techniques used by the online system 140 to train the predictive model include one or more of: a classification technique, a clustering technique, a decision tree learning technique, a random forest technique, a logistic regression technique, a linear regression technique, a gradient boosting technique, etc.

Based on strengths of the determined associations included in the training data and one or more input features describing the landing page, the trained predictive model outputs information describing a likelihood the landing page violates a policy. In various embodiments, at least one input feature used by the predictive model to predict the likelihood the landing page violates the policy is a computed 370 measure of dissimilarity between the additional hierarchical structure and one or more hierarchical structures associated with web pages violating the policy and/or web pages not violating the policy. Additional input features that may be used by the trained predictive model to output a likelihood the landing page violates the policy include various types of data describing the additional hierarchical structure, the policy, an online system user and/or third party system 130 associated with the landing page, a subject matter of the landing page, etc. In some embodiments, the online system 140 provides the trained predictive model with a computed 370 measure of dissimilarity between the additional hierarchical structure and at least one hierarchical structure associated with a web page described by the stored page data as an input feature and receives an output from the model describing a likelihood the landing page violates the policy.

Figure 9:
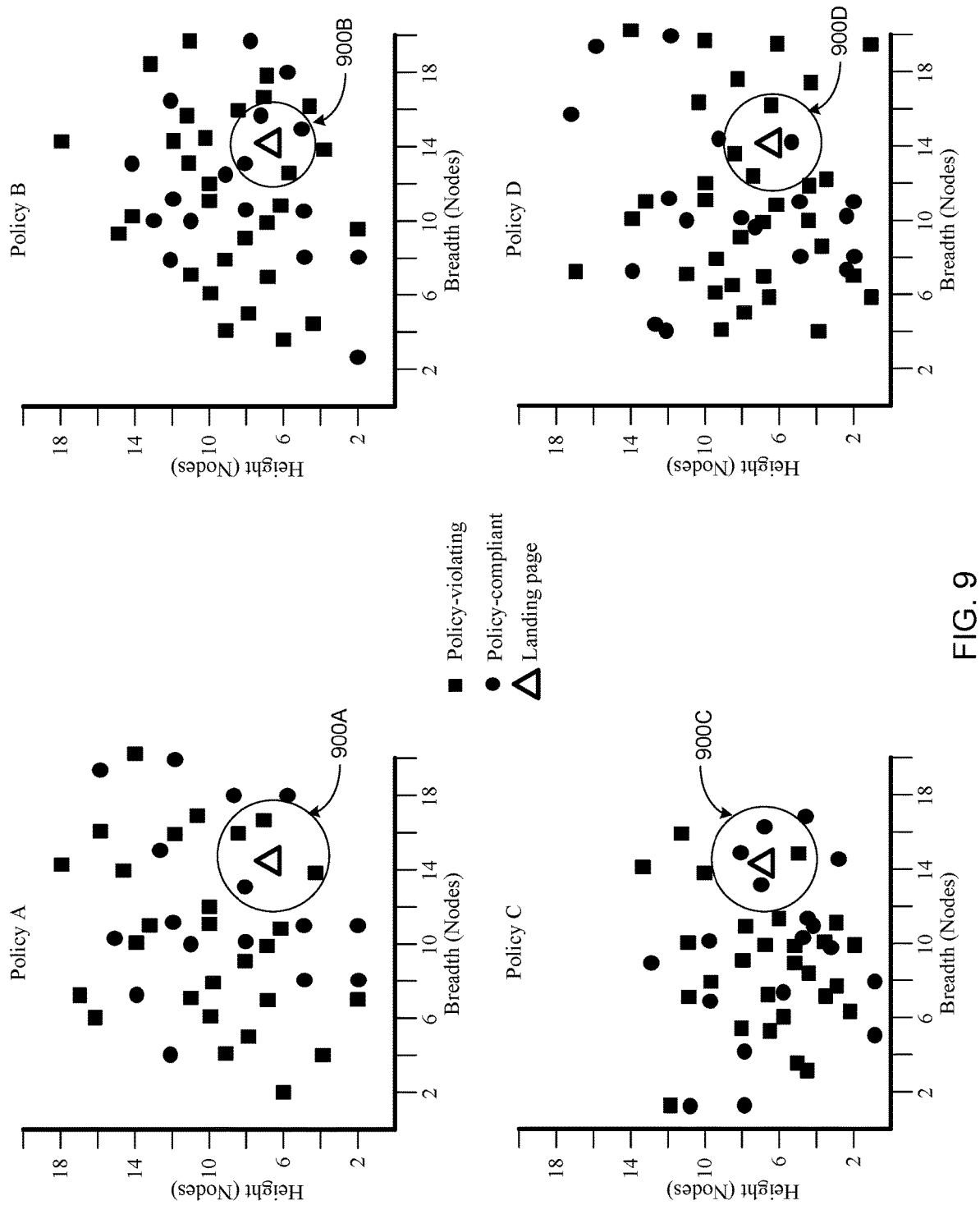
FIG. 9 illustrates example scatter diagrams describing hierarchical structures violating a set of online system policies, hierarchical structures not violating the set of online system policies and an additional hierarchical structure associated with a landing page, in accordance with an embodiment.

As an example, referring to FIG. 9, the online system 140 computes multiple measures of dissimilarity among hierarchical structures associated with web pages 310 determined to violate each policy of a set of four policies (A through D) and additional web pages determined to not violate each policy. The online system 140 applies a clustering machine-learning technique to the computed measures of dissimilarity to train a predictive model to determine associations and strengths of associations among the measures of dissimilarity. For each policy, the online system 140 plots multiple data points describing hierarchical structures associated with web pages violating the policy and additional web pages not violating the policy. As shown in this example, each data point describes a number of nodes comprising a height and breadth of each hierarchical structure and indicates whether the hierarchal structure is associated with a web page violating a policy or not violating a policy. For each policy, the online system 140 also plots a data point describing a nodal height and breadth of the additional hierarchical structure. In other embodiments, the data points may describe one or more additional or alternative attributes associated with each hierarchical structure, the additional hierarchical structure, and/or policy. Additionally, the data points may be plotted on an N-dimensional graph having one or more additional axes, in other embodiments.

In this example, using a K nearest neighbors algorithm in which K has a value of four, the online system 140 identifies four data points describing hierarchical structures nearest the data point describing the additional hierarchical structure for each policy. For example, the online system 140 identifies a set 900A of three data points describing hierarchical structures associated with web pages violating policy A and one data point describing a hierarchical structure associated with a web page not violating policy A. Similarly, the online system 140 identifies a set 900B of one data point describing a hierarchical structure associated with a web page violating policy B and three data points describing hierarchical structures associated with web pages not violating policy B. Sets 900C, 900D of data points describing hierarchical structures associated with web pages violating policies C and D, and web pages not violating policies C and D are likewise identified.

Continuing this example, for each policy, the online system 140 computes 370 a measure of dissimilarity between the additional hierarchical structure and each hierarchical structure described by the identified sets 900A-D of data points. The online system 140 provides each computed 370 measure of dissimilarity as an input feature to the trained predictive model. Based on the input measures of dissimilarity, the trained predictive model outputs information describing a predicted likelihood the landing page violates each policy. For example, the predictive model outputs a ratio describing a probability the landing page violates each policy based on determined strengths of associations among the multiple measures of dissimilarity used to train the model and the input measures of dissimilarity between the additional hierarchical structure and hierarchical structures described by the sets of data points. The online system 140 receives the output information and determines 375 a likelihood the landing page violates each policy based on the received information. For example, based on a received probability ratio describing the probability the landing page violates each policy, the online system 140 determines 375 it is either likely or not likely the landing page violates each policy.

If the online system 140 determines 380 it is likely the landing page violates a policy or there is at least a threshold likelihood the landing page violates the policy, the online system 140 performs 385 one or more corrective actions associated with the content item and/or an online system user account associated with a user from whom the content item was received, in various embodiments. Example types of corrective actions that may be performed 385 by the online system 140 include queuing the content item for manual review, disallowing presentation of the content item, communicating a warning to the user from whom the content item was received, and suspending an account on the online system 140 associated with the user. For example, upon determining 380 there is at least a threshold likelihood the landing page violates a policy, the online system 140 disallows presentation of the content item including the link to the landing page unless and until a manual review of the landing page results in a determination the landing page complies with the policy. In the previous example, the online system 140 may also send a warning to a client device 110 associated with the user from whom the content item was received, giving the user an opportunity to correct any component of the landing page suspected of violating the policy. As another example, the online system 140 associates a "policy-violating" classification identifier with the landing page and stores page data describing the landing page in the page data store 240 with the classification identifier. In this example, the additional hierarchical structure may be subsequently retrieved by the online system 140 and used in determining whether additional landing pages associated with links included in additional content items received by the online system 140 violate a policy.

In some embodiments, if the online system 140 determines 380 it is not likely the landing page violates a policy or there is less than a threshold likelihood the landing page violates the policy, the online system 140 stores 390 the content item for subsequent retrieval. For example, the online system 140 associates a "policy-compliant" classification identifier with the landing page and stores 390 page data describing the landing page in the page data store 240 with the classification identifier. In this example, the additional hierarchical structure may be subsequently retrieved by the online system 140 and used in determining whether additional landing pages violate the policy not violated by the landing page. As another example, the content item is stored 390 in the content store for possible selection by the online system 140 for presentation to online system users meeting certain targeting criteria associated with the content item. Hence, the online system 140 determines 375 a likelihood the landing page violates a content management policy based on a structural similarity between the landing page and one or more web pages determined 310 to violate or not violate the policy and may perform 385 one or more corrective actions based on the determination.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer implemented method using one or more hardware processors, the method comprising:
   for each policy of a plurality of policies maintained by an online system, determining a plurality of hierarchical structures associated with a set of web pages violating the policy, each hierarchical structure comprising a first plurality of nodes representing elements of a first markup language document corresponding to a web page of the set of web pages violating the policy;
   determining an additional hierarchical structure associated with a landing page associated with a content item received from a user of the online system, the additional hierarchical structure comprising a second plurality of nodes representing additional elements of a second markup language document corresponding to the landing page;
   identifying, using a K-nearest neighbors algorithm, a set of hierarchical structures associated with each set of web pages violating each policy of the plurality of policies having at least a threshold measure of similarity to the additional hierarchical structure;
   computing, using the one or more hardware processors, a measure of dissimilarity between each hierarchical structure of the set of hierarchical structures and the additional hierarchical structure based at least in part on a difference between the first plurality of nodes of each hierarchical structure of the set of hierarchical structures and the second plurality of nodes of the additional hierarchical structure; and
   determining a likelihood that the landing page violates each policy of the plurality of policies based at least in part on the measure of dissimilarity.

2. The method of claim 1, wherein determining a likelihood that the landing page violates each policy of the plurality of policies comprises providing the measure of dissimilarity between each hierarchical structure of the set of hierarchical structures and the additional hierarchical structure as an input feature to a trained predictive model, the trained predictive model outputting a likelihood that the landing page violates each policy of the plurality of policies based at least in part on the measure of dissimilarity.

3. The method of claim 1, wherein determining a likelihood that the landing page violates each policy of the plurality of policies is further based at least in part on a plurality of additional measures of dissimilarity between the additional hierarchical structure and a set of hierarchical structures associated with a set of additional web pages violating the policy.

4. The method of claim 1, further comprising:
   determining that the likelihood is at least a threshold likelihood; and
   responsive to determining that the predicted likelihood is at least the threshold likelihood, performing one or more corrective actions with respect to a content item having a link to the landing page.

5. The method of claim 4, wherein the one or more corrective actions are selected from the group consisting of: queuing the content item for manual review, disallowing presentation of the content item, communicating a warning to the user from whom the content item was received, and suspending an account on the online system associated with the user from whom the content item was received.

6. A computer program product comprising a non-transitory computer readable storage medium having instructions encoded thereon that, when executed by a processor, cause the processor to perform steps comprising:
   for each policy of a plurality of policies maintained by an online system, determining a plurality of hierarchical structures associated with a set of web pages violating the policy, each hierarchical structure comprising a first plurality of nodes representing elements of a first markup language document corresponding to a web page of the set of web pages violating the policy;
   determining an additional hierarchical structure associated with a landing page associated with a content item received from a user of the online system, the additional hierarchical structure comprising a second plurality of nodes representing additional elements of a second markup language document corresponding to the landing page;
   identifying, using a K-nearest neighbors algorithm, a set of hierarchical structures associated with each set of web pages violating each policy of the plurality of policies having at least a threshold measure of similarity to the additional hierarchical structure;
   computing a measure of dissimilarity between each hierarchical structure of the set of hierarchical structures and the additional hierarchical structure based at least in part on a difference between the first plurality of nodes of each hierarchical structure of the set of hierarchical structures and the second plurality of nodes of the additional hierarchical structure; and determining a likelihood that the landing page violates each policy of the plurality of policies based at least in part on the measure of dissimilarity.

7. The computer program product of claim 6, wherein determining a likelihood that the landing page violates each policy of the plurality of policies comprises providing the measure of dissimilarity between each hierarchical structure of the set of hierarchical structures and the additional hierarchical structure as an input feature to a trained predictive model, the trained predictive model outputting a likelihood that the landing page violates each policy of the plurality of policies based at least in part on the measure of dissimilarity.

8. The computer program product of claim 6, wherein determining a likelihood that the landing page violates each policy of the plurality of policies is further based at least in part on a plurality of additional measures of dissimilarity between the additional hierarchical structure and a set of hierarchical structures associated with a set of additional web pages violating the policy.

9. The computer program product of claim 6, the computer readable storage medium further having instructions for:
determining that the likelihood is at least a threshold likelihood; and
responsive to determining that the predicted likelihood is at least the threshold likelihood, performing one or more corrective actions with respect to a content item having a link to the landing page.

10. The computer program product of claim 9, wherein the one or more corrective actions are selected from the group consisting of: queuing the content item for manual review, disallowing presentation of the content item, communicating a warning to the user from whom the content item was received, and suspending an account on the online system associated with the user from whom the content item was received.

11. A computer implemented method using one or more hardware processors, the method comprising:
determining, at an online system, a hierarchical structure associated with a web page external to the online system, the hierarchical structure comprising a first plurality of nodes representing elements of a first markup language document corresponding to the web page;
determining an additional hierarchical structure associated with a landing page external to the online system, the additional hierarchical structure comprising a second plurality of nodes representing additional elements of a second markup language document corresponding to the landing page;
generating a first set of characters representing a truncated portion of the hierarchical structure and a second set of characters representing an additional truncated portion of the additional hierarchical structure;
computing, using the one or more hardware processors, a measure of dissimilarity between hierarchical structure and the additional hierarchical structure based at least in part on a difference between the first set of characters and the second set of characters; and
determining a likelihood that the landing page violates a policy maintained by the online system based at least in part on the measure of dissimilarity.

12. The method of claim 11, wherein each of the hierarchical structure and the additional hierarchical structure is a document object model (DOM) tree.

13. The method of claim 11, wherein the measure of dissimilarity comprises a minimum edit distance between the first set of characters and the second set of characters, the minimum edit distance describing a minimum number of edits making the first set of characters identical to the second set of characters.

14. The method of claim 11, wherein computing the measure of dissimilarity between the hierarchical structure and the additional hierarchical structure comprises:
generating a first hash representing the first set of characters and a second hash representing the second set of characters;
determining a Hamming distance between the first hash and the second hash; and
computing the measure of dissimilarity based at least in part on the Hamming distance.

15. The method of claim 11, wherein determining the likelihood that the landing page violates the policy is further based at least in part on a plurality of additional measures of dissimilarity between the additional hierarchical structure and a set of hierarchical structures associated with a set of additional web pages violating the policy.

16. A computer program product comprising a non-transitory computer readable storage medium having instructions encoded thereon that, when executed by a processor, cause the processor to perform steps comprising:
determining, at an online system, a hierarchical structure associated with a web page external to the online system, the hierarchical structure comprising a first plurality of nodes representing elements of a first markup language document corresponding to the web page;
determining an additional hierarchical structure associated with a landing page external to the online system, the additional hierarchical structure comprising a second plurality of nodes representing additional elements of a second markup language document corresponding to the landing page;
generating a first set of characters representing a truncated portion of the hierarchical structure and a second set of characters representing an additional truncated portion of the additional hierarchical structure;
computing a measure of dissimilarity between the hierarchical structure and the additional hierarchical structure based at least in part on a difference between the first set of characters and the second set of characters; and
determining a likelihood that the landing page violates a policy maintained by the online system based at least in part on the measure of dissimilarity.

17. The computer program product of claim 16, wherein each of the hierarchical structure and the additional hierarchical structure is a document object model (DOM) tree.

18. The computer program product of claim 16, wherein the measure of dissimilarity comprises a minimum edit distance between the first set of characters and the second set of characters, the minimum edit distance describing a minimum number of edits making the first set of characters identical to the second set of characters.

19. The computer program product of claim 16, wherein computing the measure of dissimilarity between the hierarchical structure and the additional hierarchical structure comprises:
generating a first hash representing the first set of characters and a second hash representing the second set of characters;

determining a Hamming distance between the first hash and the second hash; and computing the measure of dissimilarity based at least in part on the Hamming distance.

20. The computer program product of claim 16, wherein determining the likelihood that the landing page violates the policy is further based at least in part on a plurality of additional measures of dissimilarity between the additional hierarchical structure and a set of hierarchical structures associated with a set of additional web pages violating the policy.

\* \* \* \* \*